(12) United States Patent
Son et al.

(10) Patent No.: US 8,629,844 B2
(45) Date of Patent: Jan. 14, 2014

(54) MOBILE TERMINAL AND METHOD OF COMPOSING MESSAGE USING THE SAME

(75) Inventors: Seunghwan Son, Seoul (KR); Jin Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 789 days.

(21) Appl. No.: 12/729,645

(22) Filed: Mar. 23, 2010

(65) Prior Publication Data

US 2011/0050601 A1    Mar. 3, 2011

(30) Foreign Application Priority Data

Sep. 1, 2009  (KR) .................. 10-2009-0081779

(51) Int. Cl.
*G06F 3/041* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| 2002/0152220 | A1* | 10/2002 | Kang et al. ................. 707/101 |
| 2002/0159600 | A1  | 10/2002 | Weiner |
| 2004/0266411 | A1* | 12/2004 | Galicia et al. ............ 455/414.4 |
| 2006/0101122 | A1* | 5/2006  | Ishii ............................ 709/206 |

FOREIGN PATENT DOCUMENTS

EP        1802056       12/2005

* cited by examiner

*Primary Examiner* — Jonathan Boyd
(74) *Attorney, Agent, or Firm* — Lee, Hong, Degerman, Kang & Waimey

(57) ABSTRACT

A mobile terminal is provided that includes a touch screen and a controller. The controller operates in a first message composition mode for composing a message according to a first message format. The controller switches the first message composition mode to a second message composition mode for composing the message according to a second message format in response to a first predetermined touch input received via the touch screen. The first message format is different from the second message format.

23 Claims, 40 Drawing Sheets

MOBILE TERMINAL AND METHOD OF COMPOSING MESSAGE USING THE SAME

CROSS-REFERENCE TO RELATED APPLICATIONS

Pursuant to 35 U.S.C. §119(a), this application claims the benefit of earlier filing date and right of priority to Korean Patent Application No. 10-2009-0081779, filed on Sep. 1, 2009, the contents of which are incorporated by reference herein in their entirety.

FIELD OF THE INVENTION

The present invention relates to a mobile terminal and techniques for composing a message in a mobile terminal.

DESCRIPTION OF THE RELATED ART

A conventional mobile terminal, such as a cellular telephone, typically provides message composition and transmission functions. The message can be composed in one of various formats, such as short message service (SMS), multimedia messaging service (MMS), or e-mail format.

However, users of the conventional mobile terminal may find it inconvenient to change the message composition mode from one message composition mode using one message format to another message composition mode using another message format. For example, users may be required to search and navigate multiple menus in order to change the message composition mode.

SUMMARY

In one aspect of the present invention, a mobile terminal includes a touch screen and a controller that operates in a first message composition mode for composing a message according to a first message format and a second message composition mode for composing the message according to a second message format. The controller switches the first message composition mode to the second message composition mode for composing the message according to a second message format in response to a first predetermined touch input received via the touch screen. The first message format is different from the second message format.

It is contemplated that the controller switches the first message composition mode to the second message composition mode, such that text content of the message composed in the first message composition mode is maintained in the second message composition mode.

It is contemplated that the controller switches the first message composition mode to the second message composition mode, such that content of the message composed in the first message composition mode having a format not supported in the second message composition mode is not displayed in the second message composition mode.

It is contemplated that the controller changes the first message composition mode to the second message composition mode, such that the content of the message composed in the first message composition mode having a format not supported in the second message composition mode is stored in memory.

It is contemplated that the controller switches the first message composition mode to the second message composition mode, such that content of the message composed in the first message composition mode having a format not supported in the second message composition mode is converted to a format supported in the second message composition mode.

It is contemplated that the format supported in the second message composition mode is a text format.

It is contemplated that the first predetermined touch input includes a touch track input via an input region provided on the touch screen. It is further contemplated that the first predetermined touch input includes a touch input via at least one soft key provided on the touch screen.

It is contemplated that the controller switches from the second message composition mode to the first message composition mode in response to a second predetermined touch input received via the touch screen.

It is contemplated that the second predetermined touch input includes a touch track input via an input region provided on the touch screen. It is further contemplated that the second predetermined touch input includes a touch input via at least one soft key provided on the touch screen.

It is contemplated that the first predetermined touch input and the second predetermined touch input includes a touch input via at least one soft key provided on the touch screen and the controller switches between the first message composition mode and the second message composition mode in a toggle manner in response to the touch input via the at least one soft key It is contemplated that each of the first and second message formats include a short message service (SMS) format, a multimedia messaging service (MMS) format, an instant messaging (IM) format, or an e-mail format.

In another aspect of the invention, a mobile terminal includes a touch screen and a controller that operates in a plurality of message composition modes for composing a message, wherein each of the plurality of message composition modes allows the message to be composed according to a corresponding one of the plurality of message formats. The controller switches from a first of the plurality of message composition modes to a second of the plurality of message composition modes in response to a first predetermined touch input received via the touch screen.

It is contemplated that the controller switches the first message composition mode to the second message composition mode, such that text content of the message composed in the first message composition mode is maintained in the second message composition mode.

It is contemplated that the controller switches the first message composition mode to the second message composition mode, such that content of the message composed in the first message composition mode having a format not supported in the second message composition mode is not displayed in the second message composition mode.

It is contemplated that the controller changes the first message composition mode to the second message composition mode, such that the content of the message composed in the first message composition mode having a format not supported in the second message composition mode is stored in memory.

It is contemplated that the controller switches the first message composition mode to the second message composition mode, such that content of the message composed in the first message composition mode having a format not supported in the second message composition mode is converted to a format supported in the second message composition mode.

It is contemplated that the format supported in the second message composition mode is a text format.

It is contemplated that the first predetermined touch input includes a touch track input via an input region provided on the touch screen. It is further contemplated that the first predetermined touch input includes a touch input via at least one soft key provided on the touch screen.

It is contemplated that the controller switches from the second message composition mode to the first message composition mode in response to a second predetermined touch input received via the touch screen.

It is contemplated that the second predetermined touch input includes a touch track input via an input region provided on the touch screen. It is further contemplated that the second predetermined touch input includes a touch input via at least one soft key provided on the touch screen.

It is contemplated that the first predetermined touch input and the second predetermined touch input includes a touch input via at least one soft key provided on the touch screen and the controller switches between the first message composition mode and the second message composition mode in a toggle manner in response to the touch input via the at least one soft key It is contemplated that each of the plurality of message formats includes a short message service (SMS) format, a multimedia messaging service (MMS) format, an instant messaging (IM) format, or an e-mail format.

In another aspect of the invention, a method of composing a message in a mobile terminal including a controller and a touch screen is provided. The method includes entering, by the controller, a first message composition mode for composing the message according to a first message format and receiving, by the controller, a first predetermined touch input via the touch screen in the first message composition mode.

The method further includes switching, by the controller, from the first message composition mode to a second message composition mode for composing the message according to a second message format in response to the first predetermined touch input. The first message format is different from the second message format.

It is contemplated that the controller performs receiving a second predetermined touch input via the touch screen in the second message composition mode and switching from the second message composition mode to the first message composition mode in response to the second predetermined touch input.

It is contemplated that each of the first and second predetermined touch inputs include a predetermined touch track input via an input region provided on the touch screen or a touch input via at least one soft key provided on the touch screen.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this application, illustrate embodiments of the invention and, together with the description, serve to explain the principle of the invention. In the drawings.

DETAILED DESCRIPTION OF THE PREFERRED EMBODIMENTS

The present invention will hereinafter be described in detail with reference to the accompanying drawings in which exemplary embodiments of the invention are shown.

Hereinafter, a mobile terminal related to the present invention will be described in detail with reference to the accompanying drawings.

The mobile terminal according to some embodiments of the present invention may include, for example, a mobile phone, a smart phone, a notebook computer, a terminal for digital broadcast, a personal digital assistant (PDA), a portable multimedia player (PMP), or a navigator.

Figure 1A:
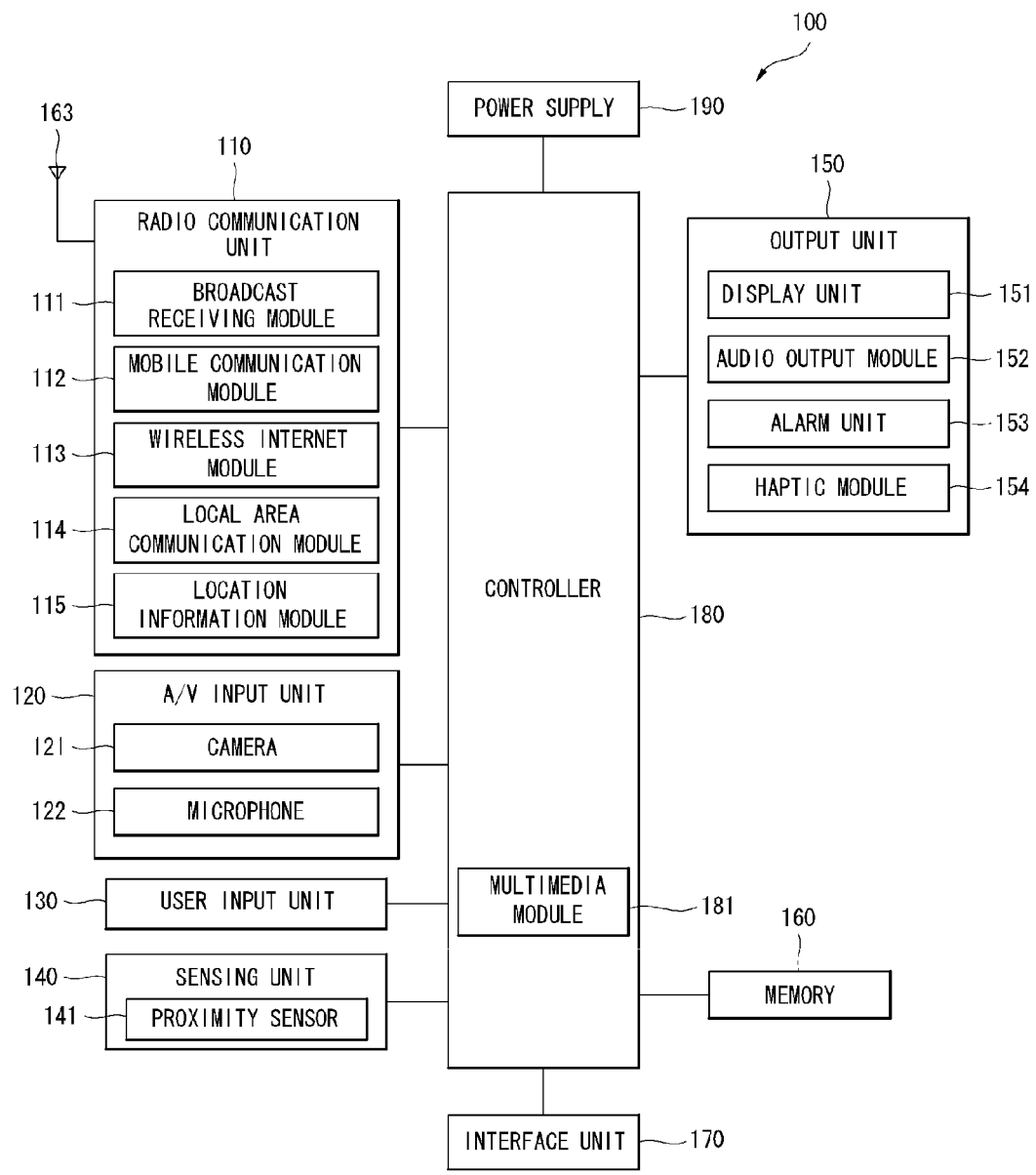
FIG. 1A is a block diagram of a mobile terminal in accordance with one embodiment of the present invention.

FIG. 1A is a block diagram of a mobile terminal 100 according to an embodiment of the present invention. As shown in FIG. 1A, the mobile terminal 100 includes a radio communication unit 110, an audio/video (A/V) input unit 120, a user input unit 130, a sensing unit 140, an output unit 150, a memory 160, an interface unit 170, a controller 180, and a power supply 190. It should be understood that the mobile terminal 100 may include additional or fewer components than those shown in FIG. 1A without departing from the spirit and scope of the invention.

The radio communication unit 110 may include at least one module that enables radio communication between the mobile terminal 100 and a radio communication system or a between the mobile terminal 100 and a network in which the mobile terminal 100 is located. For example, the radio communication unit 110 may include a broadcast receiving module 111, a mobile communication module 112, a wireless Internet module 113, a local area communication module 114, and a location information module 115.

The broadcast receiving module 111 receives broadcast signals and/or information associated with a broadcast from an external broadcast management server, or other network entity, via a broadcast channel. The broadcast channel can include a satellite channel and/or a terrestrial channel. The broadcast management server can be a server that generates and transmits a broadcast signal and/or information associated with a broadcast, or a server that receives a previously generated broadcast signal and/or information associated with a broadcast and transmits the broadcast signal and/or information associated with a broadcast to the mobile terminal 100.

For example, the broadcast signal can include a television broadcast signal, a radio broadcast signal, or a data broadcast signal. The broadcast signal can further include a broadcast signal combined with a television or radio broadcast signal.

The broadcast associated information can be information on a broadcast channel, a broadcast program or a broadcast service provider. The broadcast associated information can even be provided through a mobile communication network. In such a case, the broadcast associated information can be received by the mobile communication module 112.

The broadcast associated information can take various forms. For example, the broadcast associated information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive signals broadcast by various types of broadcast systems. In particular, the broadcast receiving module 111 can receive a digital broadcast by using a digital broadcast system, such as digital multimedia broadcasting-terrestrial (DMB-T), digital multimedia broadcasting-satellite (DMB-S), the data broadcasting system known as media forward link only (MediaFLO™), digital video broadcast-handheld (DVB-H), or integrated services digital broadcast-terrestrial (ISDB-T) systems. The broadcast receiving module 111 is configured to be suitable for every broadcast system that provides a broadcast signal as well as the above-mentioned digital broadcast systems.

Broadcast signals and/or broadcast-associated information received via the broadcast receiving module 111 can be stored in a storage medium, such as the memory 160.

The mobile communication module 112 transmits and/or receives radio signals to and/or from at least one of a base station, an external terminal (e.g., other user devices), or a server (or other network entities) in a mobile communication network. Such radio signals can include a voice call signal, a video telephony call signal, or various types of data according to text and/or multimedia message transmission and/or reception.

The wireless Internet module 113 supports wireless Internet access for the mobile terminal 100. For example, the wireless Internet module 113 can be internally or externally coupled to the mobile terminal 100. The wireless Internet technology implemented by the wireless Internet module 113 can be a wireless local area network (WLAN), Wi-Fi, Wireless Broadband (WiBro), World Interoperability for Microwave Access (WiMAX), or High-Speed Downlink Packet Access (HSDPA).

The local area communication module 114 is a module for supporting local area communication. For example, the local area communication module 114 can be configured to communicate using short range communication technology, such as Bluetooth™, radio-frequency identification (RFID), Infrared Data Association (IrDA), Ultra-wideband (UWB), or Zig-Bee™.

The location information module 115 is a module for determining the position or location of the mobile terminal 100. The location information module 115 can acquire position information using a global navigation satellite system (GNSS). The GNSS is a term used to describe radio navigation satellite systems configured to transmit respective reference signals capable of determining their positions on the surface of the earth or near the surface of the earth while orbiting the earth.

For example, the GNSS includes a global positioning system (GPS) operated by the United States of America, Galileo® operated by the EC, a global orbiting navigational satellite system (GLONASS) operated by Russia, the Compass system operated by China, and a quasi-zenith satellite system (QZSS) operated by Japan.

As a representative example of the GNSS, the location information module 115 can be a GPS module. Accordingly, the GPS module can calculate the distances between one point (or object) and at least three satellites, as well as time data that indicates when the distance information is measured. Trigonometric computations can then be applied to the distances to determine three-dimensional position information on the point (or object) according to the latitude, longitude, and altitude at a predetermined time.

A method of calculating position and time information using three satellites and correcting the calculated position and time information using another satellite can also be used. The GPS module can continuously calculate the current position in real time and calculate velocity information using the position information.

As shown in FIG. 1A, the A/V input unit 120 in FIG. 1A can include an image capture device, such as a camera 121, and a device for detecting sounds, such as microphone 122. For example, the camera 121 can process image data of still pictures or video obtained via an image sensor of the camera 121 in a video telephony or photo capture mode of the mobile terminal 100. The processed image frames can be displayed on a visual output device, such as the display unit 151.

The image frames processed by the camera 121 can be stored in the memory 160 or other storage medium, or transmitted via the wireless communication unit 110. Other embodiments of the mobile terminal 100 can include more than one camera 121.

The microphone 122 can receive sounds or audible data in a phone call mode, a recording mode, or a voice recognition mode, and can process such sounds into audio data. For example, when the mobile terminal 100 is in a phone call mode, the audio data can be appropriately converted using techniques known in the art for transmission to a mobile communication base station via the mobile communication module 112. The microphone 122 can include various types of noise canceling or suppression algorithms for removing any undesirable noise in the received sounds.

The user input unit 130 can be a user input device configured to generate input data from commands entered by a user to control various operations of the mobile terminal 100. For example, the user input unit 130 can include a keypad, a dome switch, a jog wheel, a jog switch, and/or a touch sensor, such as a touch sensitive member that detects changes in resistance, pressure, voltage, or capacitance. The user input unit 130 can include, for example, a first user input 131 and a second user input 132, which are described below with reference to FIG. 2A.

The sensing unit 140 generates commands or signals for controlling operations of the mobile terminal 100 in response to a detection of at least one status of the mobile terminal 100. For example, the sensing unit 140 can detect a current status or state of the mobile terminal 100, such as opened or closed state, the relative positions of the components of the mobile terminal 100, such as the positions of the display unit 151 and the user input unit 130, the absence or presence of user contact with the mobile terminal 100, the orientation of the mobile terminal 100, or an acceleration or deceleration of the mobile terminal 100.

For example, when the mobile terminal 100 is implemented as a slide type mobile phone, the sensing unit 140 may sense whether the phone is opened or closed. Furthermore, the sensing unit 140 can be configured to detect whether the power supply 190 supplies power and whether the interface unit 170 is connected to an external device. In one embodiment, the sensing unit 140 can include a proximity sensor.

The output unit 150 can be configured to generate a visual, an auditory, and/or a tactile output. The output unit 150 can include, for example, the display unit 151, an audio output module 152, an alarm unit 153, and a haptic module 154.

The display unit 151 can include a liquid crystal display (LCD), a thin film transistor liquid crystal display (TFT-LCD), an organic light-emitting diode (OLED) display, a flexible display, or a three-dimensional (3D) display. In one embodiment, the display unit 151 includes one or more of the abovementioned displays.

The display unit 151 can display information processed in the mobile terminal 100. For example, when the mobile terminal 100 is in a phone call mode, the display unit 151 can display a user interface (UI) or a graphic user interface (GUI) associated with placing, conducting, and terminating a telephone call or other communication. For example, if the mobile terminal 100 is in a video call mode or a photography mode, the display unit 151 may additionally or alternatively display images which are associated with such modes, or which are associated with the UI or the GUI.

In one embodiment, the display unit 151 can be configured as a transparent display, such as a transparent liquid crystal display. For example, the display unit 151 and/or the mobile terminal 100 can include translucent materials to allow a user to see through both the display unit 151 and the mobile terminal 100.

In other embodiments, the mobile terminal 100 can include two or more display units 151. The display units 151 can be arranged, for example, on one side of the mobile terminal 100 at a predetermined location or on different sides of the mobile terminal 100. For example, the mobile terminal 100 can include one or more display units 151 that are formed in a single body or unit.

When the display unit 151 and the touch sensor are overlaid in a layered manner to form a touch screen (also herein referred to as a "touch screen 151"), the display unit 151 can function both as an input device and an output device. For example, the touch sensor can include a touch film, a touch sheet, or a touch pad.

The touch sensor can be configured to convert a change in pressure or capacitance at a portion of the display unit 151 into an electric input signal. For example, the touch sensor can be configured to sense an amount of pressure applied by the touch as well as the location and area of touch.

When a touch input is applied to the touch sensor, a signal corresponding to the touch input is transmitted to a touch controller (not shown). The touch controller processes the signal and transmits data corresponding to the processed signal to the controller 180, thereby allowing the controller 180 to detect the touched portion of the display unit 151.

Referring to FIG. 1A, the proximity sensor 141 can be located within the mobile terminal 100, within the abovementioned touch screen 151, or near the touch screen 151. The proximity sensor 141 is a sensor configured to sense the presence or absence of an object relative to a detection surface or an object located nearby. The proximity sensor 141 performs detection without physical contact by using the force of electromagnetism or infrared rays. The proximity sensor 141 has a longer life span than a contact type sensor, and can be used for various purposes.

The proximity sensor 141 can include, for example, a transmission type photo-electric sensor, a direct reflection type photo-electric sensor, a mirror-reflection type photo-electric sensor, a radio frequency oscillation type proximity sensor, an electrostatic capacitive proximity sensor, a magnetic proximity sensor, or an infrared proximity sensor. In one embodiment, an electrostatic capacitive touch screen can be configured to detect the absence or presence of a pointer via a variation in an electric field caused by the proximity of the pointer to the capacitive touch screen. In such an embodiment, the electrostatic capacitive touch screen can be referred to as the proximity sensor 141.

For purposes of clarity, recognition of the location of the pointer when the pointer is positioned close to the touch screen 151 without actually contacting the touch screen 151 will be herein referred to as a "proximity touch," while recognition of the pointer when the pointer is actually in contact with the touch screen 151 will be herein referred to as a "contact touch." The location on the touch screen 151 at which a proximity touch is achieved corresponds to the location of the pointer in a perpendicular direction above the touch screen 151.

Via the proximity sensor 141, a proximity touch and a proximity touch pattern, such as a proximity touch distance, a proximity touch time, a proximity touch position, or a proximity touch shift state can be detected. For example, information corresponding to the detected proximity touch action and proximity touch pattern can be displayed on the touch screen 151.

The audio output module 152 can convert and output audio data received from the radio communication unit 110, or audio data stored in the memory 160, in a call signal receiving mode, a call mode, a record mode, a speech recognition mode, or a broadcast receiving mode. The audio output module 152 may also provide audible outputs related to a particular function performed by the mobile terminal 100, such as a call signal reception sound or a message reception sound. For example, the audio output module 152 can include a receiver, a speaker, a buzzer, or other audio producing device.

The audio output module 152 can output sound through an earphone jack 116. A user can hear the sound through earphones coupled to the earphone jack 116 (see FIGS. 2A and 2B).

The alarm unit 153 can output an alarm signal indicating the occurrence of an event in the mobile terminal 100, such as receiving a call signal, receiving a message, receiving a key signal, or a touch input. The alarm signal can be, for example, an audio signal, a video signal, and/or a tactile signal, such as a vibration signal. For example, the alarm unit 153 can output different alarm signals upon the occurrence of different events, such as receiving a call signal or a message. In addition, the alarm unit 153 can receive a key signal and output an alarm signal as feedback to the key signal.

Once an alarm signal is output by the alarm unit 153, the user can be notified that an event has occurred. An alarm signal for notifying the user of the occurrence of an event can also be output by the display unit 151 or the audio output module 152.

The haptic module 154, can provide various haptic effects (such as vibrations) that can be detected by the user. When the haptic module 154 generates vibrations, the intensity and the pattern of vibrations can be altered. The haptic module 154 can synthesize different vibration effects and can output the result. Alternatively, the haptic module 154 can sequentially output different vibration effects.

The haptic module 154 may provide various haptic effects other than vibrations that can be physically sensed by the user. For example, the haptic module may provide a stimulation caused by an arrangement of vertically moving pins that are in contact with the skin of the user, a stimulation caused by a discharge or suction of air through a discharge hole or a suction hole, a stimulation involving an application of a stimulus to the surface of the user's skin, a stimulation caused by contact with an electrode, a stimulation caused by an electrostatic force, or a stimulation caused by the application of cold and warm temperatures using an element capable of absorbing or radiating heat.

The haptic module 154 can not only provide haptic effects through direct contact, but can also allow the user to feel haptic effects via kinesthetic sense of her fingers or arms. For example, the mobile terminal 100 can include at least two haptic modules 154.

The memory 160 may store various programs that are used for the processing and operations performed by the controller 180. In addition, the memory 160 can store various data such as a phonebook, contact data, messages, still images, moving images or audio data.

The memory 160 can further store a recent use history or a cumulative frequency of usage of data, such as the frequency of use of the phonebook, messages, or multimedia. The memory 160 can store data related to various patterns of vibrations and audio signals for output when a touch input is applied to the touch screen 151.

For example, the memory 160 may include at least one type of storage medium, such as a flash memory, a hard disk, a multimedia card, a micro type memory, a card type memory, such as a secure digital (SD) card or extreme digital (XD) card, a random access memory (RAM), a static random access memory (SRAM), a read-only memory (ROM), a programmable ROM (PROM), an erasable programmable read-only memory (EPROM), an electrically erasable programmable read-only memory (EEPROM), magnetic memory, a magnetic disk, or an optical disk.

In other embodiments, the memory 160 can be a network storage device that can be accessed by the mobile terminal 100 via a network connection. For example, the memory 160 can be accessed by the mobile terminal 100 via the Internet.

The interface unit 170 can interface with an external device that can be connected to the mobile terminal 100. For example, the interface unit 170 can be a wired/wireless headset, an external power supply port or a battery charger port, a wired/wireless data port, a memory card port, an earphone port or a port for interfacing with an identification module, such as a subscriber identification module (SIM)/user identity module (UIM) card port, an audio input/output (I/O) port, a video I/O port, or an earphone port.

The interface unit 170 can receive data from an external device or can be used to receive power from an external device. The interface unit 170 can transmit data provided by an external device to other components in the mobile terminal 100 or can transmit data provided by other components in the mobile terminal 100 to an external device.

The identification module can be an element with memory or storage capabilities, such as a memory chip, and configured to store various types of information for authenticating a user's authority to use the mobile terminal 100. For example, the identification module can include a user identify module (UIM), a subscriber identify module (SIM), and a universal subscriber identify module (USIM). For example, the identification module can be integrated into an identification device, such as a smart card. Accordingly, the identification module can be connected to the mobile terminal 100 via a port of the mobile terminal 100.

When the mobile terminal 100 is connected to an external cradle (not shown in FIG. 1A), power can be supplied from the external cradle to the mobile terminal 100 through the interface unit 170. In addition, various command signals can be transmitted from the external cradle to the mobile terminal 100 through the interface unit 170. Various command signals or power provided by the cradle can operate as a signal for recognizing when the mobile terminal is properly mounted on the cradle.

The controller 180 can control the general operations of the mobile terminal 100. For example, the controller 180 can be a microprocessor configured to perform various control operations related to making and receiving a voice call, transmitting and receiving data, or making and receiving a video call. The controller 180 can perform pattern recognition processing to recognize a character or image from a handwriting input or a picture-drawing input performed on the touch screen 151.

The controller 180 can include a multimedia module 181 for reproducing or playing back multimedia data. In one embodiment, the multimedia module 181 can be implemented as a hardware device and can be installed in the controller 180. In another embodiment, the multimedia module 181 may be implemented as a software program.

The power supply unit 190 can be an external power source or an internal power source and supplies power to other components in the mobile terminal 100. In one embodiment, the power supply unit 190 can include a battery. In one embodiment, the battery can be a rechargeable battery.

The various components described herein can be implemented in a computer-readable medium using, for example, computer software, hardware, or any combination thereof.

For example, the components described herein can be implemented in hardware using application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In other embodiments, such components can be implemented by the controller 180.

For example, the procedures or functions described herein can be implemented in software using separate software modules, such as procedures and functions, each of which perform at least one of the functions or operations described herein. Software codes can be implemented by a software application or program written in any suitable programming language. The software codes can be stored in the memory 160 and executed by the controller 180.

Figure 1B:
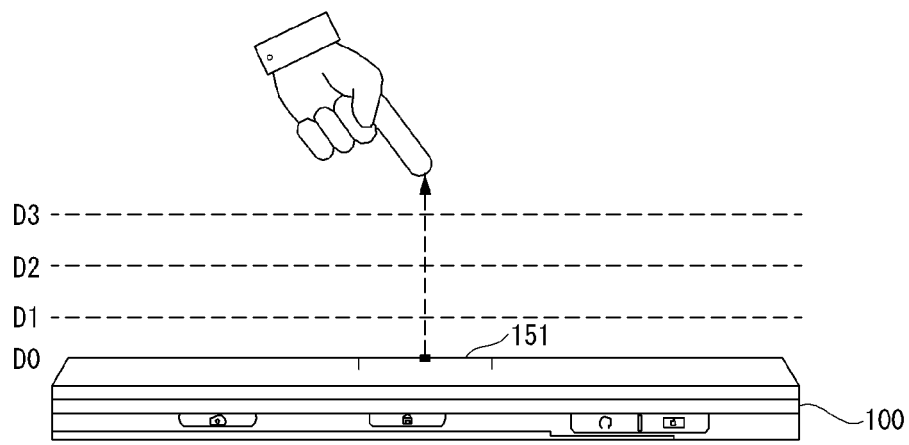
FIG. 1B shows a proximity sensor of the mobile terminal in accordance with one embodiment of the present invention.

The proximity sensor 141 will now be described in more detail with reference to FIG. 1B. FIG. 1B shows a proximity sensor 141 of the mobile terminal 100 in accordance with one embodiment of the present invention.

As shown in FIG. 1B, when a pointer, such as a user's finger or stylus, approaches the touch screen 151, that is, display unit 151, the proximity sensor 141 located inside or near the touch screen 151 senses the approach of the pointer and provides a proximity signal. The proximity sensor 141 can be configured to output a proximity signal indicating the distance between the pointer and the touch screen 151. Such a distance is also referred to in the art as a "proximity depth."

The distance at which the proximity signal is provided by the proximity sensor 141 when the pointer approaches the touch screen 151 is referred to as a detection distance. For example, the proximity depth can be determined by using a plurality of proximity sensors, such as proximity sensor 141, having various detection distances and by comparing the proximity signals provided by each corresponding proximity sensor.

The exemplary mobile terminal 100 shown in FIG. 1B is configured to detect three proximity depths, such as proximity depths D1, D2, and D3, where each proximity depth represents the distance from the touch screen 151 to a location above the touch screen 151 in a substantially perpendicular direction above the touch screen 151. The relationships between the proximity depths D0, D1, D2, and D3 can be expressed as: D0<D1<D2<D3. It should be understood that in other embodiments, the mobile terminal 100 can be configured to include less than or greater than three proximity sensors to enable detection of any number of proximity depths.

For example, when a contact touch is performed, that is, when the pointer comes into contact with the touch screen 151, the proximity depth D0 is detected and it is recognized as a contact touch; when the pointer is located within the proximity depth D1 and the proximity depth D0, a proximity touch at the proximity depth D1 is recognized; when the pointer is located between the proximity depth D1 and the proximity depth D2, a proximity touch at the proximity depth D2 is recognized; when the pointer is located within the proximity depth D2 and the proximity depth D3, a proximity touch at the proximity depth D3 is recognized; when the pointer is located at a distance greater than the proximity depth D3, no proximity touch is recognized.

Accordingly, the controller 180 can recognize the proximity touch as proximity input signals according to the proximity distance and proximity position of the pointer with respect to the touch screen 151 and can perform various operations and controls according to the provided proximity input signals.

Figure 2A:
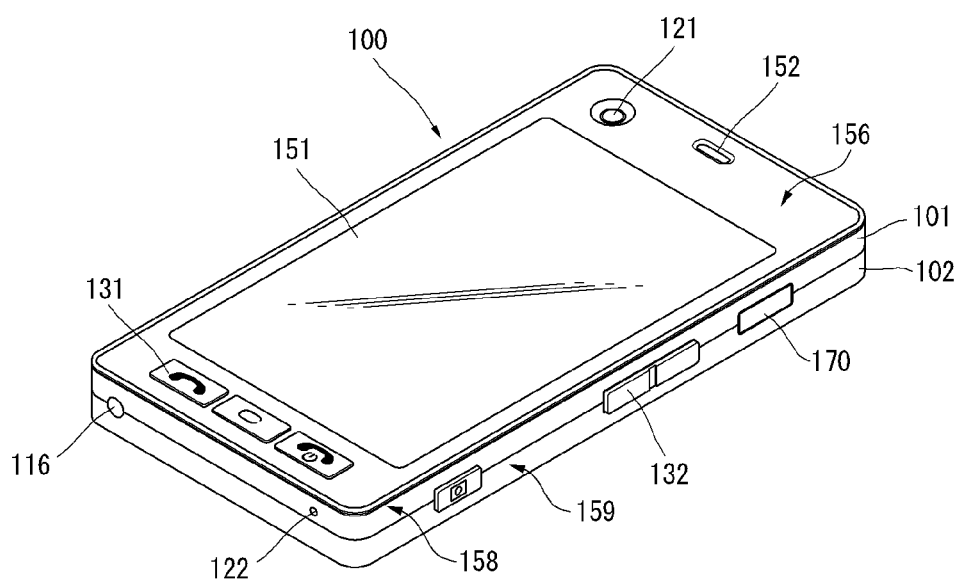
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type body. However, it should be understood that the mobile terminal 100 is not limited to a bar type body and can have a body type including at least two or more bodies that can move relative to one another, such as a slide type body, folder type body, rotational type body, swing type body, and a swivel type body.

The case of the mobile terminal 100, otherwise referred to as a "casing," "housing," or "cover," constituting the exterior of the mobile terminal 100, can include a front case 101 and a rear case 102. Various electronic components are installed in the space between the front case 101 and the rear case 102. One or more intermediate cases can be additionally disposed between the front case 101 and the rear case 102.

For example, the front case 101 and the rear case 102 can be made by injection-molding of plastics. Alternatively, the front case 101 and the rear case 102 can be made of a metallic material, such as stainless steel (STS) or titanium (Ti).

The display unit 151, the audio output module 152, the camera 121, the first user input unit 131, the second user input unit 132, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output module 152 and the camera 121 can be arranged in proximity to one end of the display unit 151, and the first user input unit 131 and the microphone 122 can be located in proximity to another end of the display unit 151. As further shown in FIG. 2A, the second user input unit 132 and the interface unit 170 are arranged on the sides of the front case 101 and the rear case 102, such as sides 158 and 159, respectively.

The user input unit 130 described above with respect to FIG. 1A can be configured to receive commands for controlling the operation of the mobile terminal 100 and can include one or more user inputs, such as the first user input 131 and the second user input 132 shown in FIG. 2A. The first user input unit 131 and the second user input unit 132 can each be referred to as a "manipulation unit." Each manipulation unit can be configured to use various methods and techniques of tactile manipulation and response to facilitate operation by the user.

The first user input unit 131 and the second user input unit 132 can be configured to receive various inputs. For example, the first user input unit 131 can be configured to receive a start command, an end command, and a scroll command, and the second user input unit 132 can be configured to receive a volume control command for controlling the sound output from the audio output module 152, or a mode change command to change the mode of the display unit 151 to a touch recognition mode.

Figure 2B:
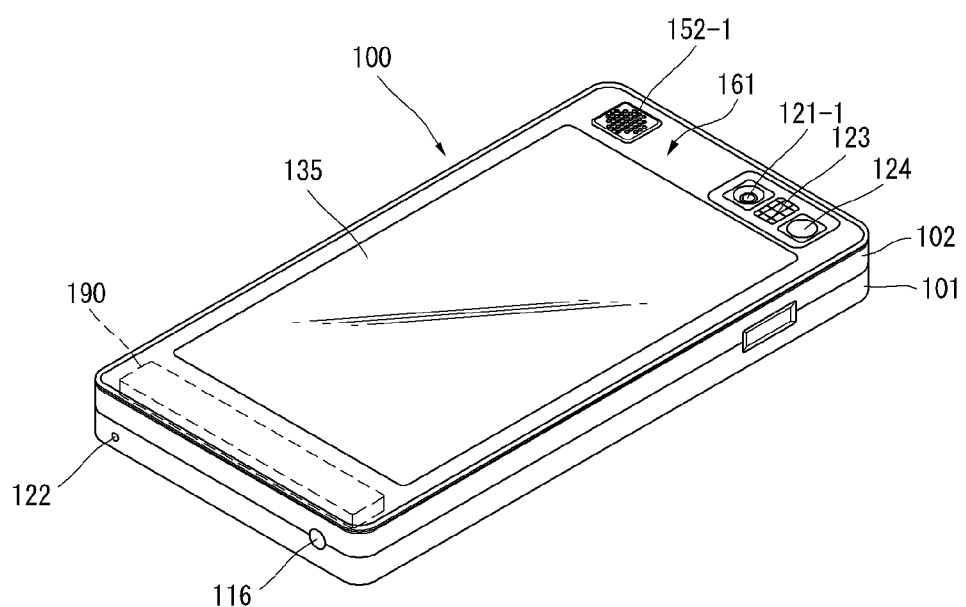
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 or other image capture device can be located on a rear surface 161 of the rear case 102. The camera 121-1 has a direction of view that is substantially opposite to the direction of view of the camera 121 shown in FIG. 2A.

For example, if the camera 121 is positioned to view the front of the mobile terminal 100, then the camera 121-1 is positioned to view the rear of the mobile terminal 100. The cameras 121 and 121-1 can have different resolutions, that is, different pixels counts, with respect to one another.

For example, the camera 121 can operate with a relatively lower resolution than the camera 121-1 in order to capture an image of the user to allow immediate transmission of the image to another user in real-time for video telephony. On the other hand the camera 121-1 can operate with a relatively higher resolution than the camera 121 to capture images of general objects with high picture quality, which may not require immediate transmission in real-time, but may be stored for later viewing or use. For example, the camera 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see herself when the user desires to capture her own image using the camera 121-1.

The rear surface 161 of the rear case 102 can further include a second audio output module 152-1. The second audio output module 152-1 can support stereophonic sound functions in conjunction with the first audio output module 152 shown in FIG. 2A and can be used for communication during a phone call when the mobile terminal 100 is in a speaker phone mode.

The broadcast receiving module 111 can include, for example, a broadcast signal receiving antenna (not shown in FIG. 1A) located at one side of the mobile terminal 100, in addition to antenna 163 shown in FIG. 1A used for mobile telephone communications. For example, the broadcast signal receiving antenna can be configured to be retractable from the mobile terminal 100.

FIG. 2B shows the power supply 190 for providing power to the handheld terminal 100. For example, the power supply 190 can be situated either inside the mobile terminal 100 or detachably coupled to an external portion of the mobile terminal 100.

As shown in FIG. 2B, a touch pad 135 for sensing a touch by the user can be located on the rear surface 161 of the rear case 102. In one embodiment, the touch pad 135 and the display unit 151 can be translucent. In such an embodiment, the information displayed on display unit 151 can be viewed through the touch pad 135. The information displayed on the display unit 151, which can be viewed through the touch pad 135, can be controlled by the touch pad 135. In another embodiment, a display unit in addition to display unit 151 can be located on the rear surface 161 of the rear case 102 and combined with the touch pad 135 to form the touch screen 151 on the rear case 102.

In the embodiment shown in FIGS. 2A and 2B, the touch pad 135 located on the rear case 102 can be configured to allow manipulation by the user of items displayed on the display unit 151 located on the front case 101. For example, the touch pad 135 can be positioned substantially parallel to the display unit 151.

For example, the touch pad 135 can have a size that is similar to the size of the display unit 151. In other embodiments, the touch pad 135 can have a different size relative to the display unit 151.

Figure 3A:
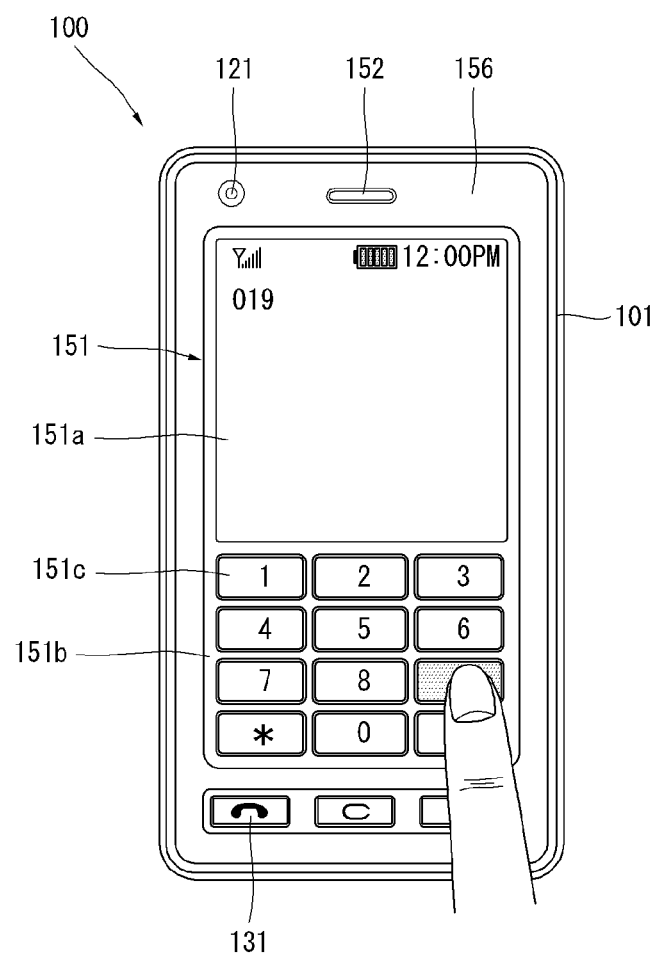
FIG. 3A shows a front view of the mobile terminal in a portrait orientation in accordance with one embodiment of the present invention.
Figure 3B:
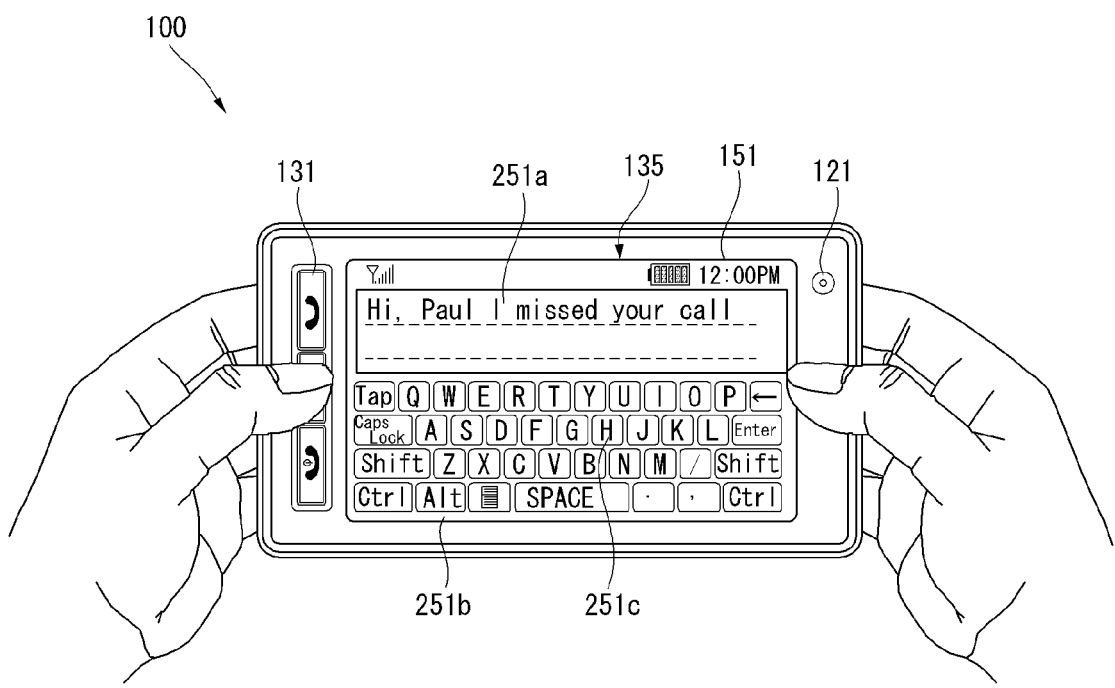
FIG. 3B shows a front view of the mobile terminal in a landscape orientation in accordance with one embodiment of the present invention.

The interoperation between the display unit 151 and the touch pad 135 will now be described with reference to FIGS. 3A and 3B. FIG. 3A shows a front view of the mobile terminal 100 in a portrait orientation in accordance with one embodiment of the present invention. FIG. 3B shows a front view of the mobile terminal 100 in a landscape orientation in accordance with one embodiment of the present invention.

For example, the display unit 151 can be configured to display various types of information, such as characters, numerals, symbols, icons, and/or images. A user can input such information via a virtual keypad displaying an arrangement of at least a character, numeral, symbol, icon, or image on the display unit 151.

Each key 151c of the virtual keypad described above is also referred to in the art as a "soft key." As shown in FIG. 3A, a user can input a character by touching a soft key on the display unit 151 located on the front surface 156 of the front case 101.

In one embodiment, the entire area of the display unit 151 can be configured to perform a single function. In other embodiments, two or more portions of the display unit 151 can be configured to perform different functions. In such an embodiment, the two or more portions of the display unit 151 can be configured to interoperate with one another.

For example, and as shown in FIG. 3A, an upper portion of the display unit 151 is configured as an output window 151a and a lower portion of the display unit 151 is configured as an input window 151b. As also shown in FIG. 3A, the input window 151b can display an arrangement of one or more soft keys, such as soft key 151c. For example, when a soft key in input window 151b is touched by a user, a character, number, or other input corresponding to the touched soft key can be displayed on the output window 151a.

As shown in FIG. 3A, for example, the soft keys 151c in input window 151b can each represent a numeral which can be used by a user to input a telephone number. When the user operates the first input unit 131, for example, the mobile terminal 100 can attempt to place a call to the telephone number displayed on the output window 151a.

As shown in FIG. 3B, the mobile terminal 100 can be configured to convert the orientation of the image displayed in display unit 151 according to the current orientation of the mobile terminal 100. As shown in FIG. 3B, the mobile terminal 100 can be configured to operate in a text input mode.

As shown in FIG. 3B, the display unit 151 can display an output window 251a and an input window 251b. As further shown in FIG. 3B, one or more soft keys, such as soft key 251c, that correspond to at least one of a character, symbol, or numeral can be arranged in the input window 251b. As further shown in FIG. 3B, the one or more soft keys 251c can be arranged in a QWERTY configuration. Other embodiments of the mobile terminal 100 can include a different configuration of the one or more soft keys 251c.

For example, when a user operates a soft key 251c, by touching the soft key via the touch pad 135 located at the rear of the mobile terminal 100, a character, numeral, or symbol corresponding to the touched soft key can be displayed on the output window 251a. It can be appreciated that by allowing a user to operate the soft keys 251c via the touch pad 135 at the rear of the mobile terminal 100, the mobile terminal 100 prevents a user from obstructing a view of the soft keys displayed in input window 251b by the user's hands, thereby greatly improving the user's efficiency when inputting data. When the display unit 151 and the touch pad 135 are both either translucent or transparent, the user can see his own fingers located behind the mobile terminal 100 through the display unit 151 and the touch pad 135, and thus can accurately guide his fingers to the desired soft keys to correctly and efficiently operate the soft keys.

In one embodiment, the display unit 151 or the touch pad 135 can be configured to operate a scroll command in response to a touch input by the user. For example, the user can scroll the display unit 151 or the touch pad 135 to move an object displayed in the display unit 151, such as a cursor or a pointer located on an icon. In another embodiment, when a user moves his finger across the display unit 151 or the touch pad 135, the path of the user's finger can be visually displayed on the display unit 151 to facilitate various operations and functions of the mobile terminal 100, such as image editing.

For example, in an embodiment where the display unit 151 is configured as a touch screen, if the display unit 151 and the touch pad 135 are simultaneously touched by the user for a predetermined period of time, such as when the user clamps the mobile terminal 100 between his thumb and index finger, a specific function of the mobile terminal 100 can be executed. For example, the specific function can be an activation or deactivation of the display unit 151 or the touch pad 135.

In the embodiments of the invention described herein, the display unit 151 is configured as a touch screen for convenience of description. As described above, the touch screen 151 can display information and allow the input of information. It is noted that the present invention is not limited to the functions described herein. Moreover, in the embodiments presented herein, a touch input can include a contact touch and/or a proximity touch. The proximity touch will be described in detail with reference to FIG. 1B.

A message composition mode described herein refers to a mode for composing a message having one of various formats. For example, the various formats can include one or more of a short message service (SMS) format, a multimedia messaging service (MMS) format, an instant messaging (IM) format, or an e-mail format.

Accordingly, a message can include one or more contents corresponding to at least one format. For example, a message having the SMS format can include text content, and a message having the MMS format can include at least one of text content, image content, and file content. A message having the IM format and a message having the e-mail format can each include at least one of text content, image content, and file content in the same manner as the message having the MMS format.

Various message composition modes can have different content formats according to message specifications or communication service providers. The following exemplary embodiments are described using the SMS and MMS message composition modes to maintain brevity.

Figure 4:
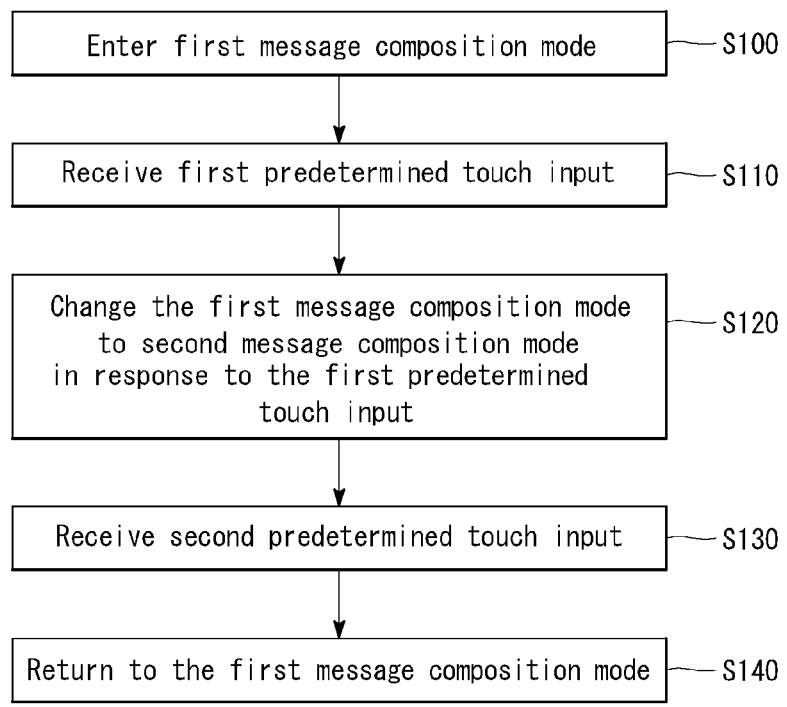
FIG. 4 is a flowchart illustrating a method of composing a message using the mobile terminal according to one embodiment of the present invention.
Figure 5:
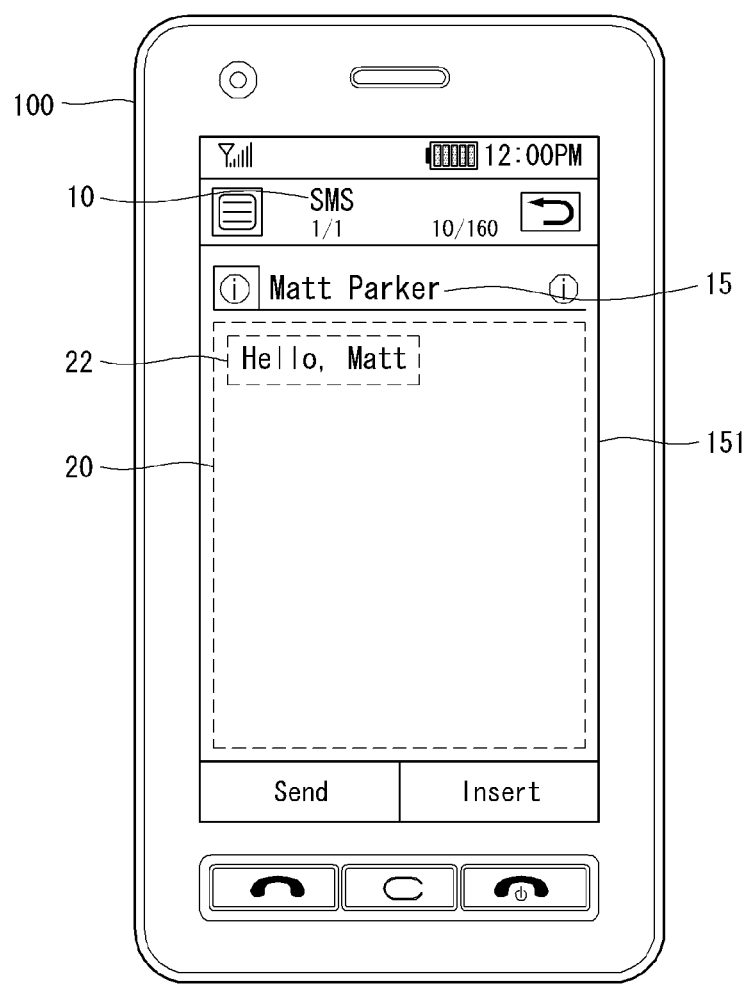
FIG. 5 is a diagram showing an exemplary screen of the mobile terminal according to one embodiment of the present invention where the controller has entered the first message composition mode.
Figure 6:
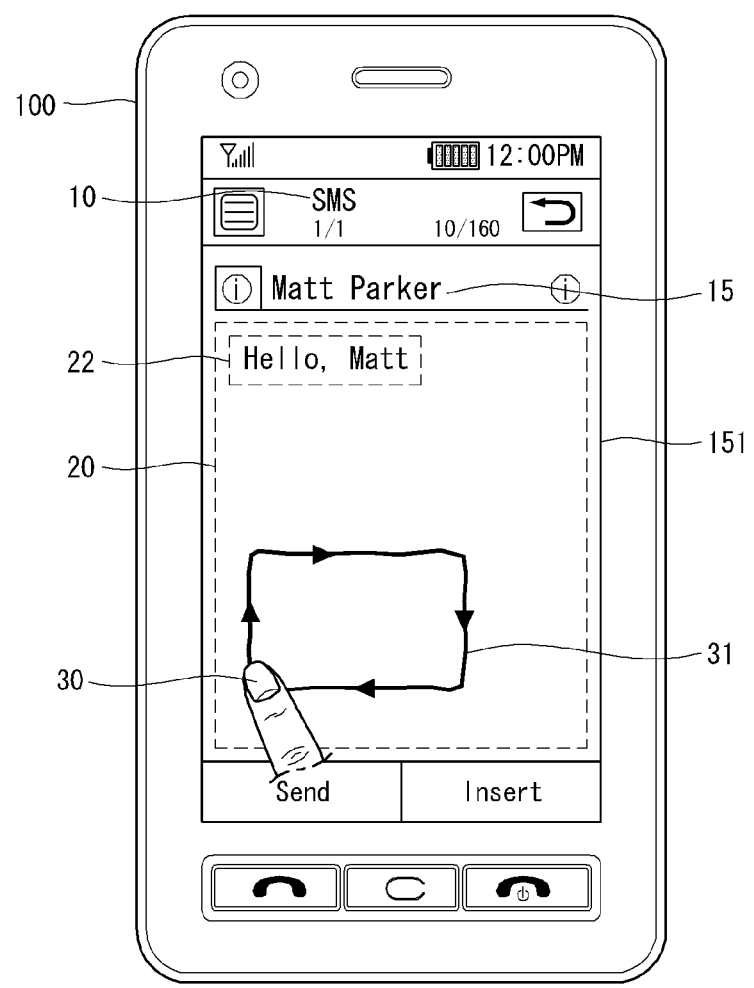
FIG. 6 shows an exemplary predetermined touch track on the message display region according to one embodiment of the present invention.
Figure 8A:
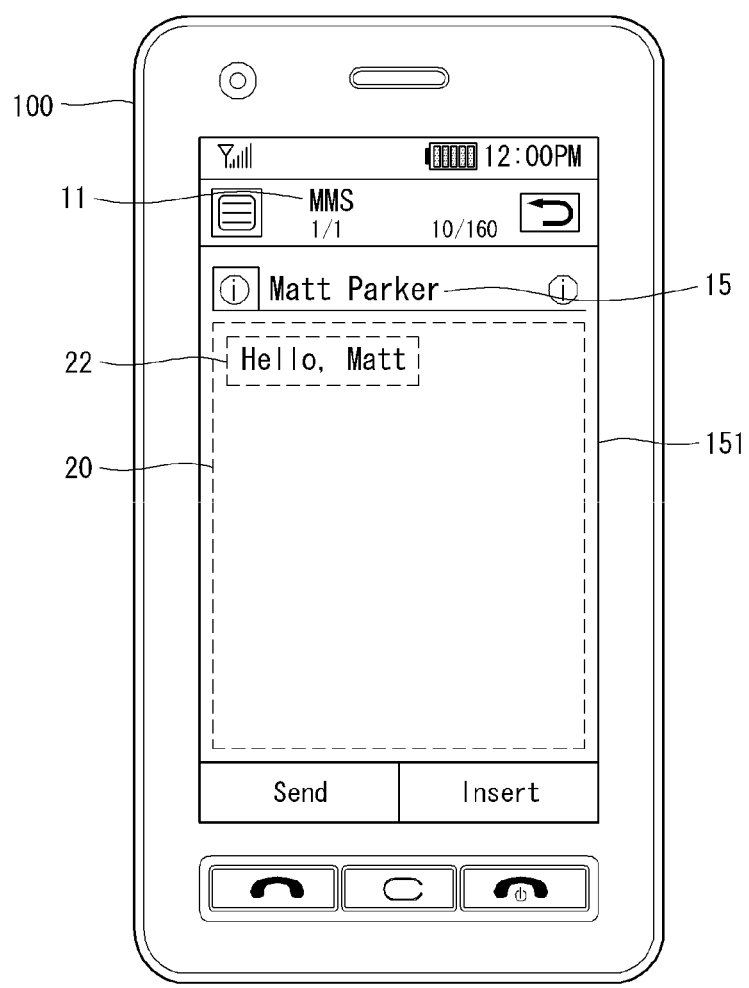
FIGS. 8A-8B are diagrams showing exemplary content, which is composed or input by the user in the second message composition mode for composing a message using the MMS format according to one embodiment of the present invention.
Figure 8B:
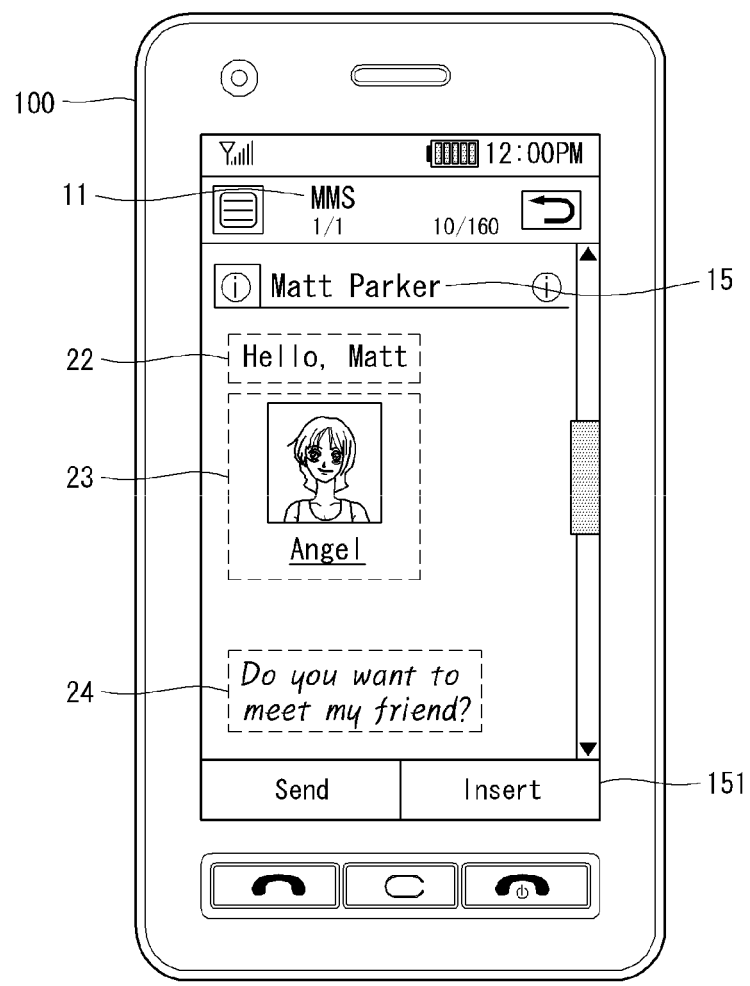
Figure 9A:
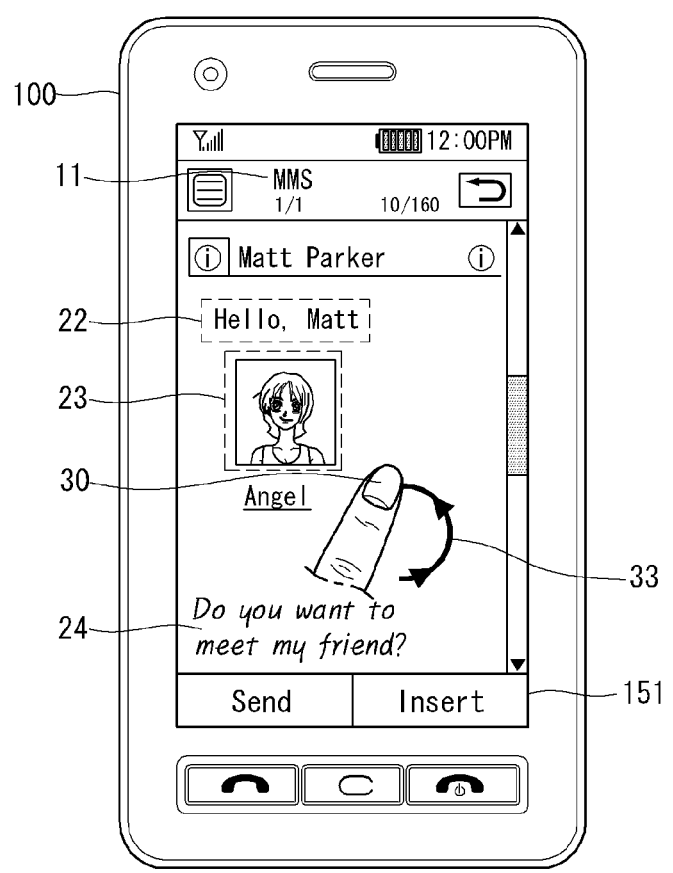
FIGS. 9A-9C show exemplary screens illustrating a return of the message composition mode from the second message composition mode to the first message composition mode according to one embodiment of the present invention.
Figure 9B:
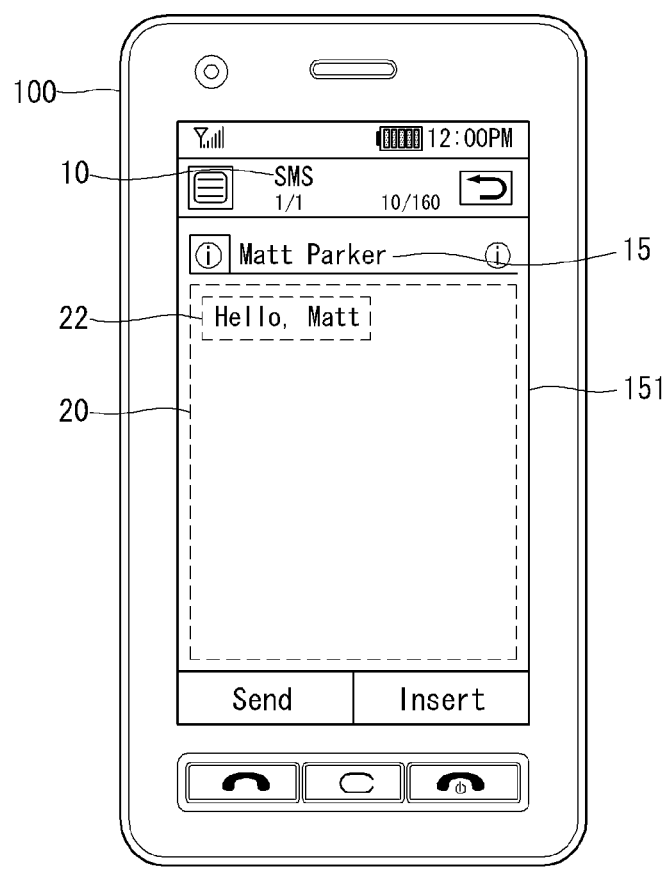
Figure 9C:
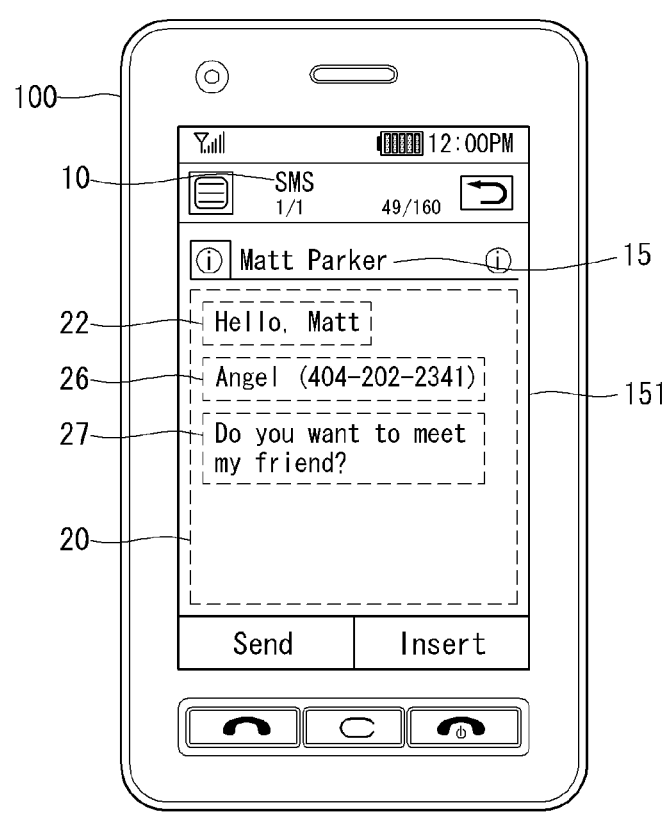

FIG. 4 is a flowchart illustrating a method of composing a message using the mobile terminal 100 in accordance with a first embodiment of the present invention. FIG. 5 is an exemplary screen of the mobile terminal 100 corresponding to step S100. FIGS. 6 to 7B are exemplary screens of the mobile terminal 100 corresponding to step S110. FIGS. 8A and 8B are exemplary screens of the mobile terminal 100 corresponding to step S120. FIGS. 9A to 9C are exemplary screens of the mobile terminal 100 corresponding to step S130 and step S140.

The method of composing a message using the mobile terminal 100 in accordance with the first embodiment of the present invention can be implemented in the mobile terminal 100 described with reference to FIGS. 1 to 3B. The method of composing a message using the mobile terminal according to the first embodiment of the present invention and an operation of the mobile terminal 100 for implementing the method are described below.

With reference to FIG. 4, the controller 180 enters a first message composition mode (S100). In the first message composition mode, a message having a first message format can be composed. The first message format can be an SMS, MMS, IM, or an e-mail format.

After entering the first message composition mode, the controller 180 receives a first predetermined touch input (S110). The controller 180 then changes the first message composition mode to a second message composition mode in response to the first predetermined touch input (S120). The first predetermined touch input can be performed using any of the various techniques described below.

Once the first message composition mode has been changed to the second message composition mode, the controller 180 receives a second predetermined touch input (S130). The second predetermined touch input can be performed using any of the various techniques described below. The controller 180 then returns to the first message composition mode from the second message composition mode in response to the second predetermined touch input (S140).

FIG. 5 is a diagram showing an exemplary screen of the mobile terminal 100 where the controller 180 has entered the first message composition mode (S100). In FIG. 5, the first message composition mode enables a message having the SMS format to be composed. FIG. 5 shows exemplary text content 22, which can be input by the user via the various techniques.

Referring to FIG. 5, the controller 180 can configure the display unit 151 to display a message format indicator 10 that indicates the first message format, such as "SMS," message recipient information 15, and a message display region 20 displaying a message to be sent in the first message composition mode. For example, the message recipient information 15 can be set by a user.

In one embodiment where the display unit 151 is implemented as a touch screen, the message display region 20 can be utilized as an input region, such as input window 251, for inputting a message via a touch input. In another embodiment where the display unit 151 is implemented as a touch screen, the message display region 20 can be utilized as an input region, such as input window 251b, for receiving a touch input configured to switch the message composition mode, separately from the input of a message.

In one embodiment, a message can be composed by a user using one or more of the various techniques described above and the controller 180 can display the composed message on the message display region 20. For example, when the user inputs various characters, numerals, and/or symbols through the keypads of the user input unit 130, the controller 180 displays the characters, numerals, and/or symbols input by the user on the message display region 20.

Figure 7A:
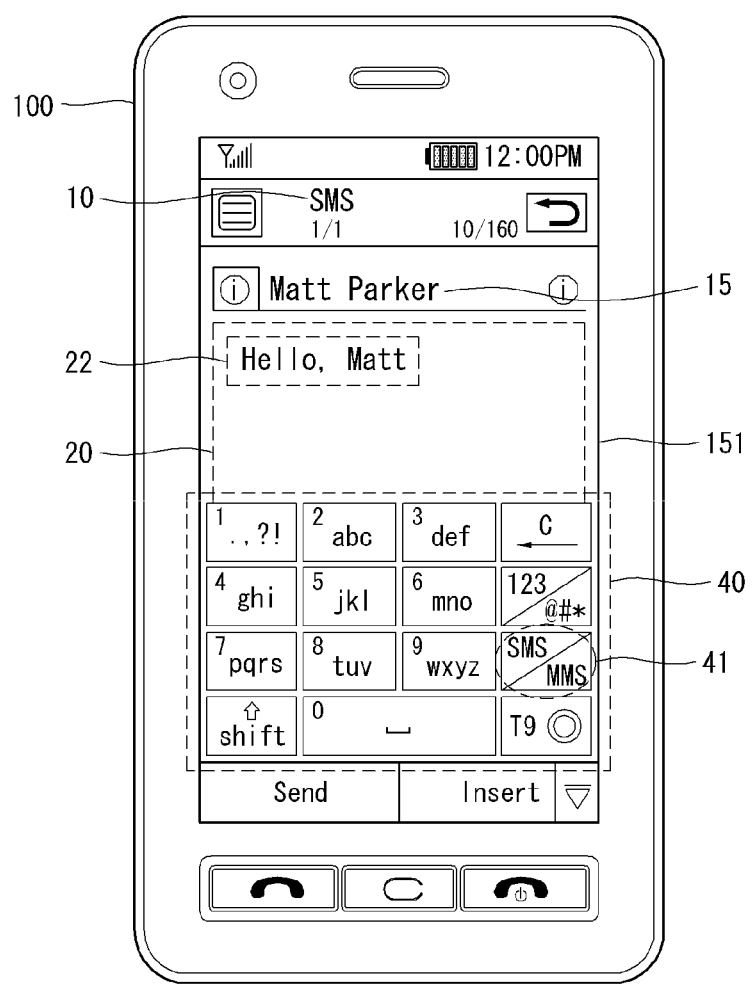
FIGS. 7A-7B show exemplary soft keys configured to switch the message composition mode according to one embodiment of the present invention.
Figure 7B:
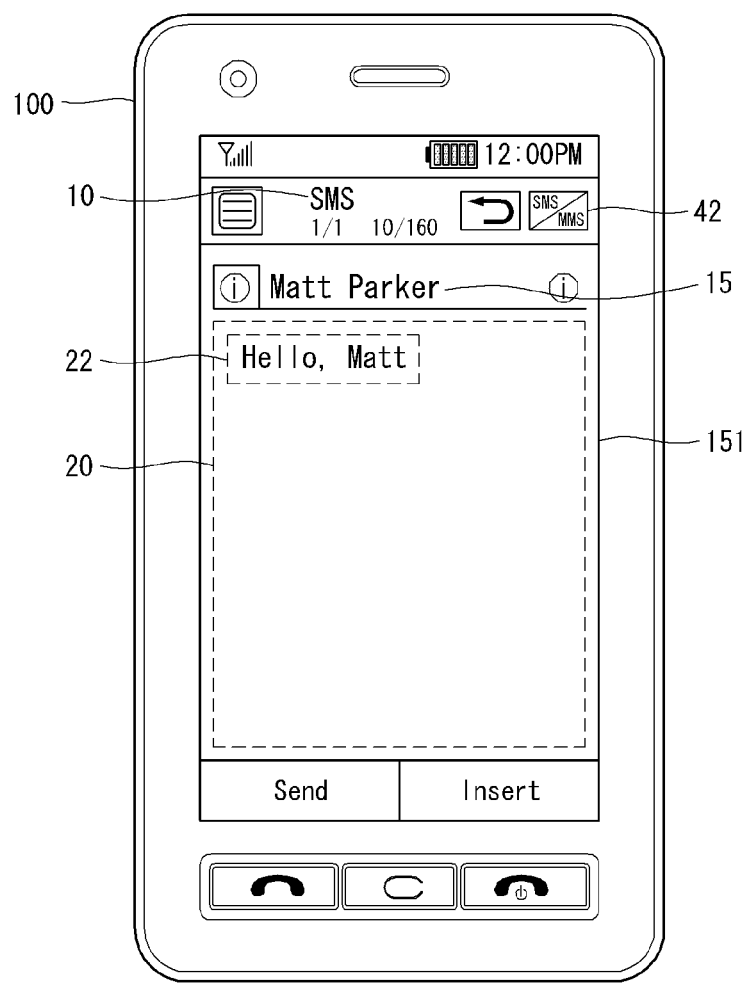

As another example, in the embodiment where the display unit 151 is implemented as a touch screen, the controller 180 displays the composed message on the message display region 20 when the user composes a message using a virtual keypad, such as virtual keypad 40 shown in FIG. 7A, provided in the message display region 20.

As yet another example, in the embodiment where the display unit 151 is implemented as a touch screen, when the user draws a track corresponding to a character, a numeral, or a symbol on the message display region 20 using his or her finger or a stylus, the controller 180 recognizes the track as the corresponding character, numeral, or symbol and displays the character, numeral, or symbol corresponding to the recognized track on the message display region 20.

The first predetermined touch input can be performed using various techniques. In one embodiment, the first predetermined touch input can correspond to a predetermined touch track, which can be input via the input region provided in the touch screen.

FIG. 6 shows an exemplary predetermined touch track 31 on the message display region 20, which can be drawn by a user, for example, using his or her finger 30. It should be understood that the predetermined touch track 31 shown in FIG. 6 represents only one example and that in other embodiments, the predetermined touch track 31 can be configured to have a different form.

In another embodiment, the first predetermined touch input can be a touch input corresponding to a soft key provided in the touch screen. For example, the soft key can be assigned a function of switching the message composition mode.

FIGS. 7A and 7B each show exemplary soft keys configured to switch the message composition mode.

In one embodiment, with reference to FIG. 7A, the controller 180 can display a virtual keypad 40 on the touch screen 151, which includes the soft keys 41. The user can execute a command for switching the message composition mode by touching any one of the soft keys 41.

In another embodiment, with reference to FIG. 7B, the controller 180 can display the soft keys 42 at a specific location of the touch screen 151. The user can execute a command for switching the message composition mode by touching any one of the soft keys 42.

The first predetermined touch input can be several touch inputs that are received within a specific period of time via the touch screen 151, or at specific point of a predetermined region of the touch screen 151, such as the message display region 20. Alternatively, the first predetermined touch input can be an extended touch input that is performed within a predetermined period of time via the touch screen 151, or at a specific point of a predetermined region of the touch screen 151, such as the message display region 20.

For example, with reference to FIG. 8A, the controller 180 can change the first message composition mode for composing a message using the SMS format to the second message composition mode for composing a message using the MMS format in response to receiving the first predetermined touch input (S120) via any one of various methods described above with respect to FIGS. 6 to 7B. For example, FIG. 8A shows the message format indicator 11, which indicates the change in the status of the message composition mode from SMS to MMS.

After entering the second message composition mode, the controller 180 can maintain or delete content that is included in a message composed in the first message composition mode. For example, as shown in FIG. 8A, the controller 180 can maintain the text content 22 composed in the first message composition mode even in the second message composition mode.

A method of the controller 180 processing a message that is composed or input before the change operation of the message composition mode is described with respect to FIG. 8B. FIG. 8B is a diagram showing exemplary content which is composed or input by the user in the second message composition mode for composing a message using the MMS format.

Referring to FIG. 8B, the user can compose or input an image 23 that corresponds to a specific person or entity included in a phonebook, such as the image of a person named "Angel," and a specific track 24 drawn by the user using his or her finger in the second message composition mode in addition to the text content 22 composed in the first message composition mode. An example of a method to input the image 23 is described below with reference to the pertinent drawings.

In FIG. 8B, the text content 22, the image 23, and the specific track 24 can be used to compose a message having a single MMS format. A method of the controller 180 processing or managing the text content 22, the image 23, and the specific track 24 is described later.

The second predetermined touch input can also be performed using the various techniques described above with respect to the first predetermined touch input. For example, the second touch input can be a second predetermined touch track which is input through the input region 20 provided in the touch screen or a touch input applied to a soft key. For example, the soft key can be assigned to either or both a change function and a return function of the message composition mode. The second touch track corresponding to the second predetermined touch input can be set or changed by the user.

FIGS. 9A-9C show exemplary screens illustrating a return of the message composition mode from the second message composition mode to the first message composition mode (S140). For example, the controller 180 can return the message composition mode from the second message composition mode, such as the MMS composition mode shown in FIG. 9A, to the first message composition mode, such as the SMS composition mode shown in FIGS. 9B and 9C (S140).

In the present disclosure, a "change" operation of a message composition mode of the controller 180 and a "return" operation of the message composition mode of the controller 180 are both herein defined as an operation where the message composition mode of the controller 180 is changed from one message composition mode to a different message composition mode. Moreover, the "return" operation refers to a change of the message composition mode from a current message composition mode to a previous message composition mode.

With reference to FIG. 9A, when the user draws a specific touch track 33 corresponding to the second predetermined touch input using his or her finger 30, the controller 180 can perform the return operation corresponding to the specific touch track 33. It should be understood that the return operation can be performed using various techniques.

For example, referring to FIGS. 9A and 9B, upon receiving the specific touch track 33 shown in FIG. 9A, the controller 180 can return to the SMS composition mode in a state where the image content 23 and the specific track 24 input in the MMS composition mode are removed, while only maintaining the text content 22 that was input before entering the MMS composition mode.

As another example, referring to FIGS. 9A and 9B, upon receiving the specific touch track 33 shown in FIG. 9A, the controller 180 can remove only content that was input in the MMS composition mode having a format not supported by the SMS composition mode and return to the SMS composition mode. Therefore, if both the image content 23 and the specific track 24 have formats not supported in the SMS composition mode, the controller 180 can remove both the image content 23 and the specific track 24 and return to the SMS composition mode.

As yet another example, referring to FIGS. 9A and 9C, upon receiving the specific touch track 33 shown in FIG. 9A, the controller 180 can convert any content input in the MMS composition mode having a format not supported by the SMS composition mode into content having a format supported by the SMS composition mode.

In one embodiment, the specific track 24 can be recognized by the controller 180 as text using a character recognition algorithm or a suitable program. Accordingly, as shown in FIG. 9C, when returning to the SMS composition mode in response to the specific touch track 33, the controller 180 can convert the specific track 24 into text content 27.

In one embodiment, the image 23 shown in FIG. 9A can correspond to a specific person or entity included in a phonebook, such as a person named "Angel." The image 23 can be converted into text information 26, which can be generated using text information included in the phonebook or text information corresponding to the specific person or entity, as shown in FIG. 9C.

The techniques for performing a return operation described above with reference to FIGS. 9A through 9C can also be used for performing a change operation between various message composition modes. Various contents can be displayed, composed or otherwise input when the controller 180 is in a first message composition mode. Upon exiting the first message composition mode and entering a second message composition mode, the controller 180 can maintain only the contents having a format supported in the second message composition mode.

For example, an image file attached to a message in an MMS composition mode typically has a format not supported in an SMS composition mode. Therefore, upon exiting the MMS composition mode and entering the SMS composition mode, the image file can be deleted. Alternatively, the controller 180 can store the contents having a format not supported in the second message composition mode in the memory 160 or a suitable storage device.

In one embodiment, various contents can be displayed, composed or otherwise input when the controller 180 is in a first message composition mode. Upon exiting the first message composition mode and entering a second message composition mode, the controller 180 can convert the contents having a format not supported by the second message composition mode into contents having a format that is supported by the second message composition mode.

For example, in the case where an image input by a user's finger in the MMS composition mode corresponds to text, the controller 180 can recognize the image input as text and display the recognized text in the SMS composition mode. The controller 180 can control text information, such that the text information is always maintained despite a change between different message composition modes.

Figure 10:
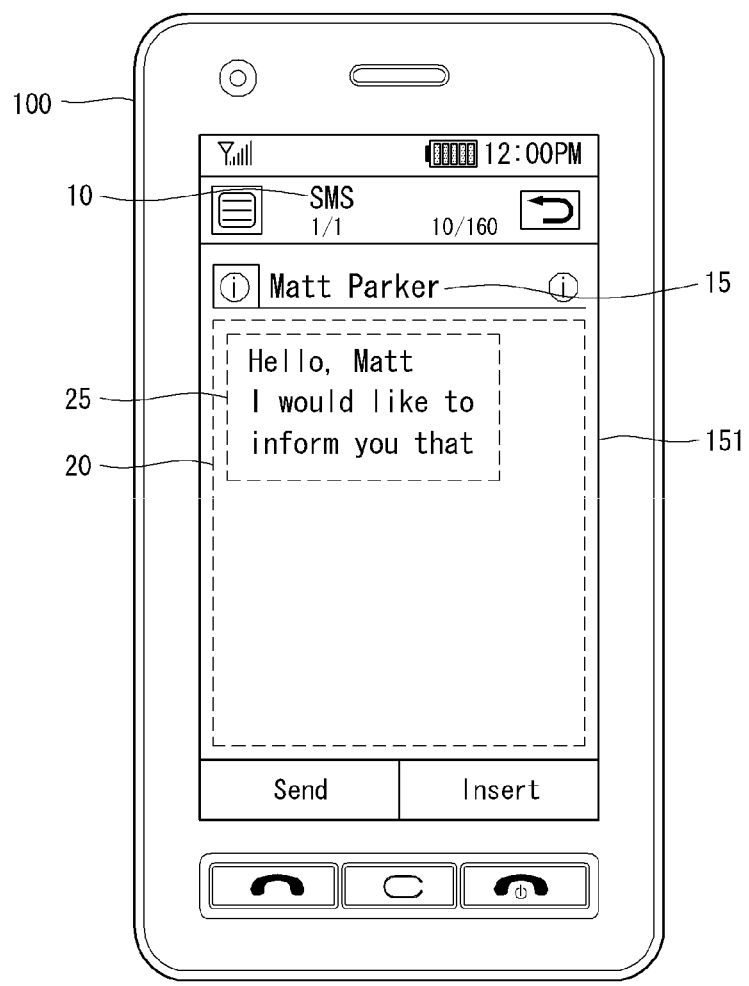
FIGS. 10 and 11A-11B are diagrams showing exemplary screens of a method for composing a message using the mobile terminal according to one embodiment of the present invention.
Figure 11A:
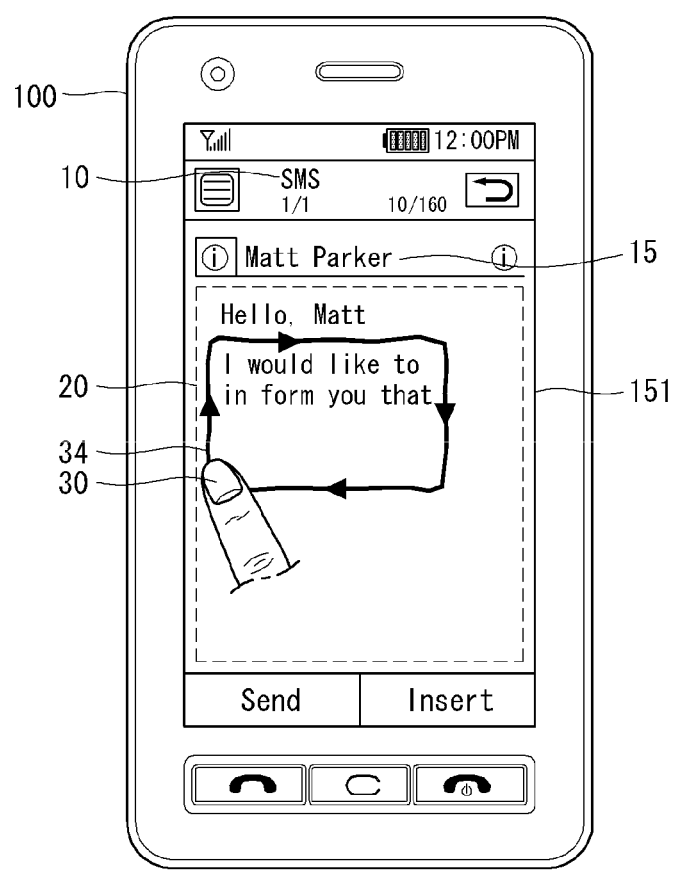
Figure 11B:
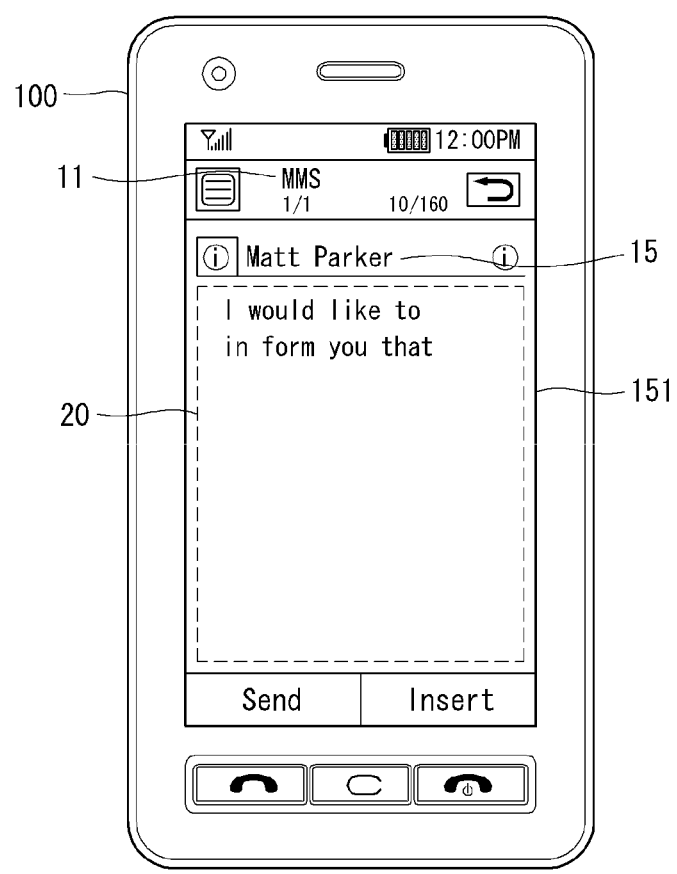

FIGS. 10 and 11A-11B are diagrams showing exemplary screens of a method for composing a message using the mobile terminal according to a second embodiment of the present invention. The second embodiment of the present invention can be implemented according to the same process as the first embodiment of the present invention described above with reference to FIG. 4, but with a different implementation of steps S110 and S120.

As shown in FIG. 10, the display unit 151 can be implemented as a touch screen and can display text information 25 that is input when the controller 180 is in a first message composition mode, such as the SMS composition mode. As shown in FIG. 11A, for example, a user can draw a touch track 34 using his or her finger 30 such that the touch track 34 forms a perimeter of a closed shape surrounding a portion of the text information 25.

For example, the touch track 34 can be performed using the techniques described above with respect to the first predetermined touch input. Upon receiving the touch track 34, the controller 180 can change the first message composition mode, such as the SMS composition mode, to a second message composition mode, such as the MMS composition mode, by performing a change operation.

As shown in FIG. 11B, when performing the change operation, the controller 180 maintains in the second message composition mode only the specific text information in the second message composition mode that is within the closed shape formed by the touch track 34. For example, as shown in FIG. 11B, the controller 180 can delete the text information located outside the closed shape formed by the touch track 34, such as the text "Hello, Matt," when entering the second message composition mode.

A method of composing a message using the mobile terminal 100 according to a third embodiment of the present invention and an operation of the mobile terminal 100 for implementing the method are described below in detail. The third embodiment of the present invention discloses a method of managing content that is input or composed in the message composition modes according to the present invention.

The controller 180 can manage content input or composed in a specific message composition mode using various techniques. For example, referring to FIG. 9A, the controller 180 can manage the content 22, which is input in the SMS composition mode, and the contents 23 and 24, which are input in the MMS composition mode, as separate data files.

The content 22 is content having a text format and the contents 23 and 24 are contents having an image format. The content 23 can include information, such as a name and a telephone number corresponding to a person named "Angel" included in a phonebook of the mobile terminal 100.

In one embodiment, referring to FIG. 9A, when the controller 180 changes the MMS composition mode to the SMS composition mode, the contents 23 and 24 not supported in the SMS composition mode can be stored in a separate database. For example, the database may be included in the memory 160.

FIGS. 12A through 12D are exemplary screens illustrating the management of contents in a message composition mode using separate data files in accordance with one embodiment of the invention. For example, referring to FIG. 12A, the controller 180 can store contents which are composed or input in a specific message composition mode in the separate files folders 55 whenever messages are composed.

Figure 12A:
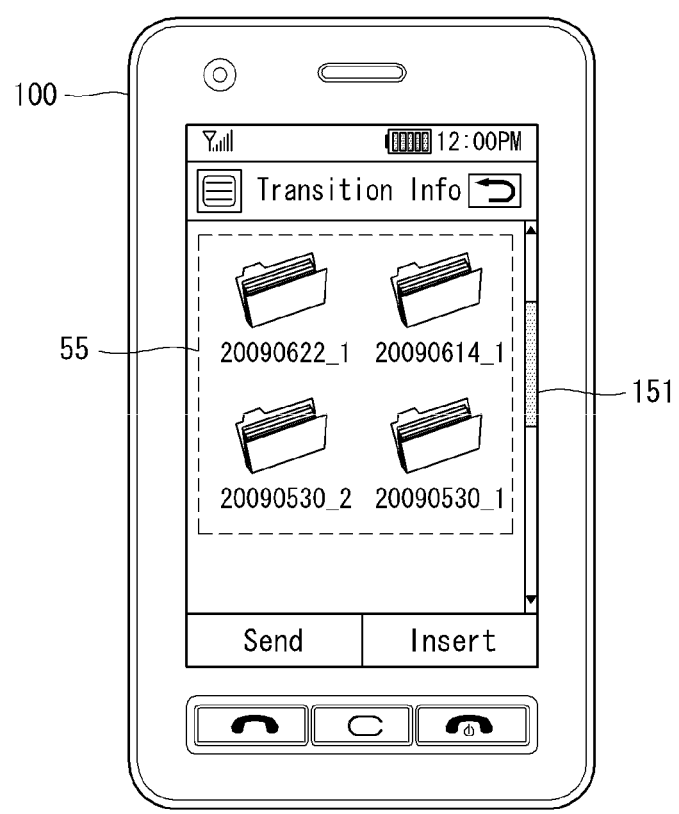
FIGS. 12A-12D are exemplary screens illustrating the management of contents in a message composition mode using separate data files in accordance with one embodiment of the present invention.
Figure 12B:
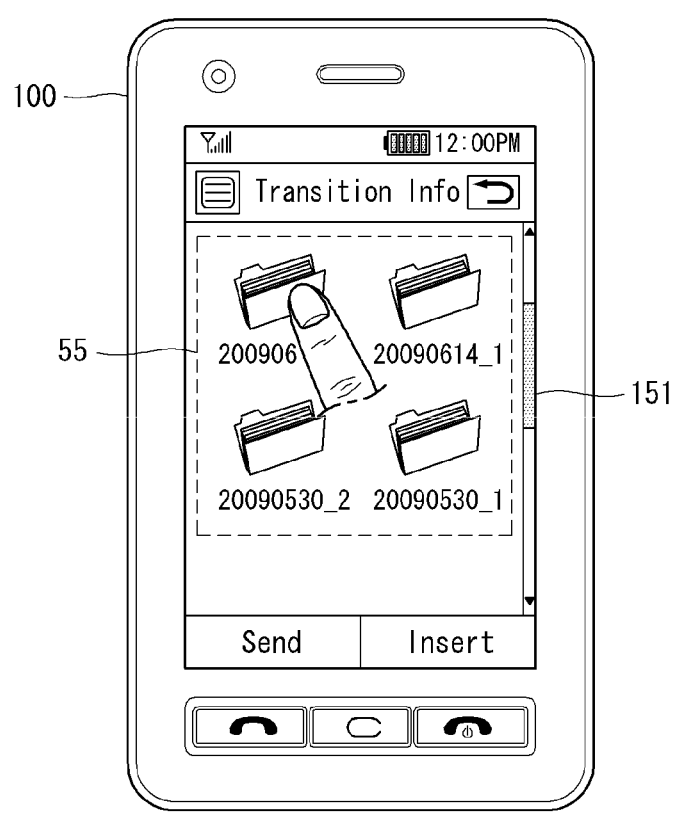

Referring to FIG. 12B, for example, the user can select a file folder from among the file folders 55 displayed in FIG. 12A. Upon selecting the file folder, the controller 180 can display the contents included in the file folder as shown in FIG. 12C.

Figure 12C:
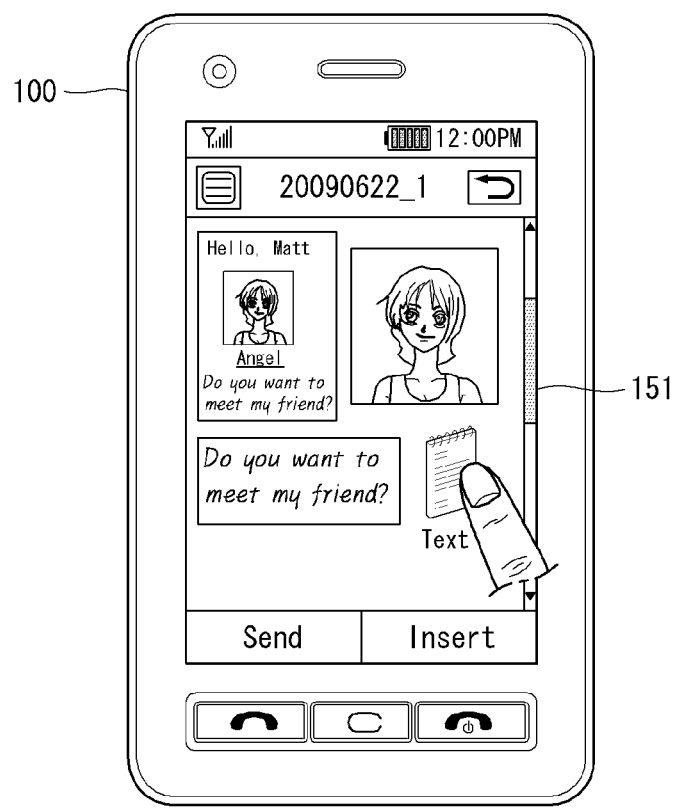
Figure 12D:
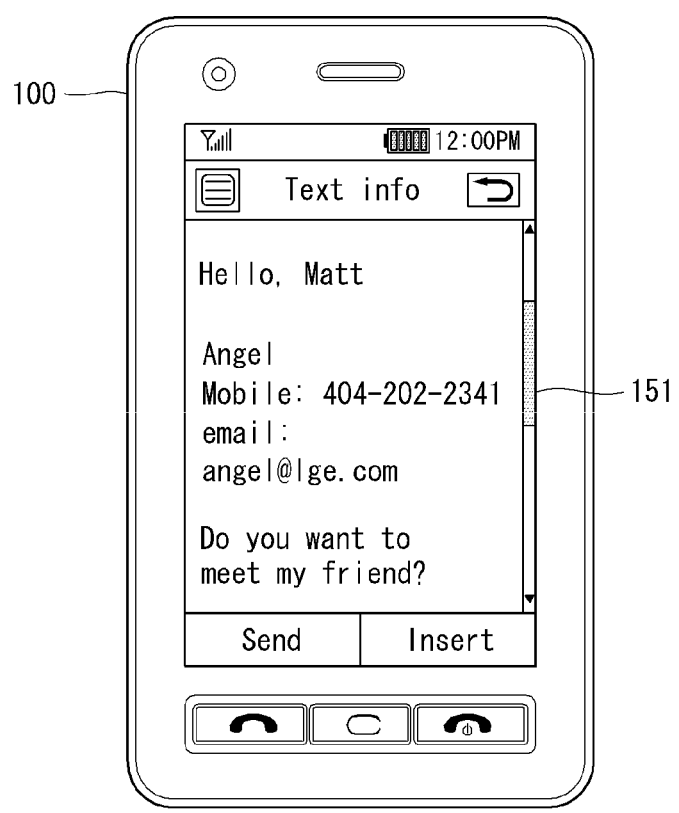

As further shown in FIG. 12C, the user can select a specific content from among the displayed contents, such as the content labeled "Text." In one embodiment, the controller 180 can display detailed information corresponding to the selected content, as shown in FIG. 12D.

As described above, the controller 180 can manage contents which are input or composed in a variety of message composition modes in the form of separate data files, such as text, images, and/or attached files. In the MMS composition screen shown in FIG. 9A, when the user issues a send command, a message composed in the MMS composition mode is sent to a designated receiving part.

For example, the controller 180 can configure the various contents 22, 23, and 24 included in the message as separate data files and can transmit the data files to the designated receiving part. The receiving part can receive the transmitted message and can manage the contents 22, 23, and 24 as separate data files. Alternatively, the controller 180 can manage contents input or composed in a variety of message composition modes as a single file.

A method of composing a message using the mobile terminal 100 according to a fourth embodiment of the present invention and an operation of the mobile terminal 100 for implementing the method are described below in detail. The fourth embodiment of the present invention provides a an exemplary method for composing a message in the MMS composition mode.

For example, the controller 180 can display a virtual keypad on the touch screen 151 in response to a command received from a user or upon entering the MMS composition mode. The user can input text information using the virtual keypad.

Figure 13:
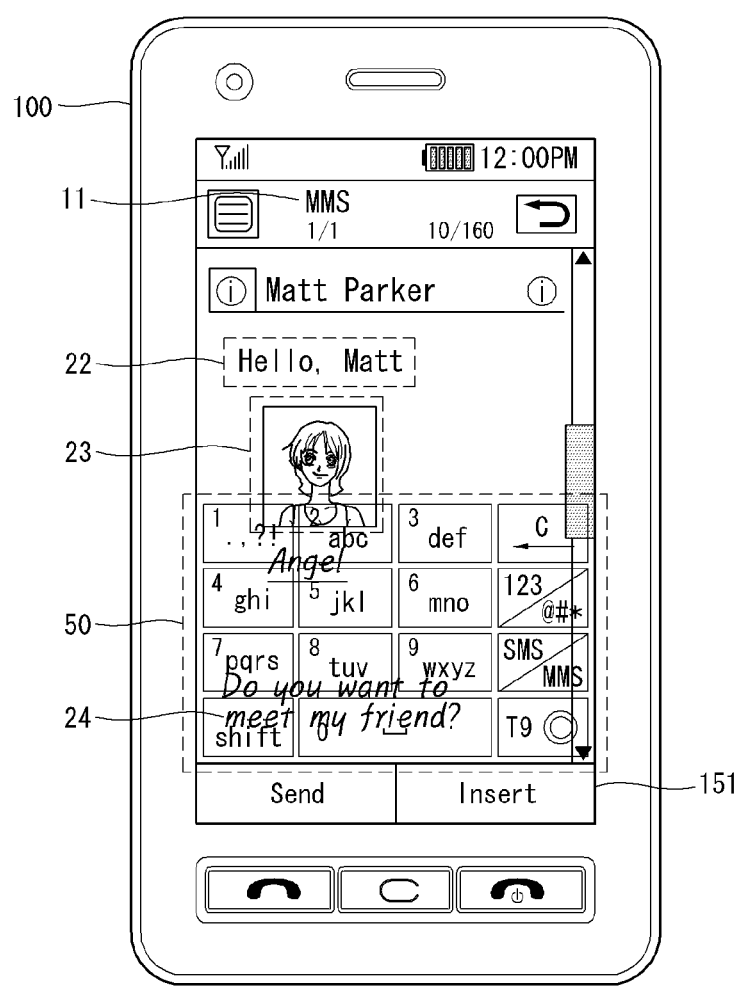
FIG. 13 is a diagram showing an example of a virtual keypad which is provided in the MMS composition mode according to one embodiment of the present invention.

FIG. 13 is a diagram showing an example of a virtual keypad 50 which is provided in the MMS composition mode. As shown in FIG. 13, the virtual keypad 50 can be displayed transparently or translucently, such that it does not impair the visibility of contents previously input in the MMS composition mode. In one embodiment, information input via the virtual keypad 50 can be displayed on the lower part of contents previously input in the MMS composition mode, at a location corresponding to previously input text, or on the upper part of the previously input contents when the previously input text does not exist.

A method of composing a message using the mobile terminal 100 according to a fifth embodiment of the present invention and an operation of the mobile terminal 100 for implementing the method will be described with respect to FIGS. 14A through 14H. For example, image content can be input in the MMS composition mode when the SMS composition mode changes to the MMS composition mode or after the SMS composition mode has changed to the MMS composition mode.

Figure 14A:
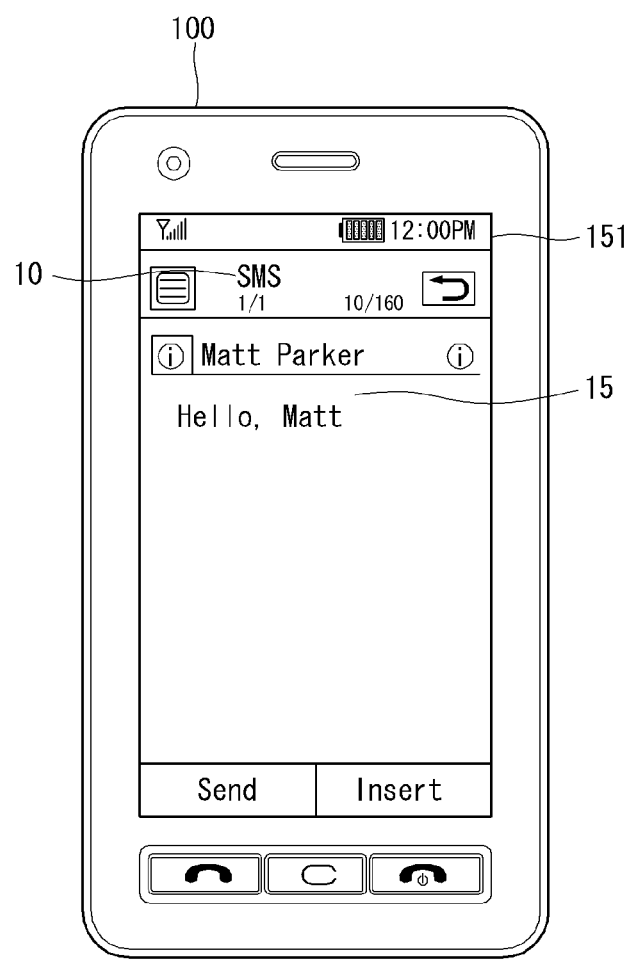
FIGS. 14A-14H are exemplary screens illustrating the method of composing a message using the mobile terminal 100 according to one embodiment of the present invention.
Figure 14B:
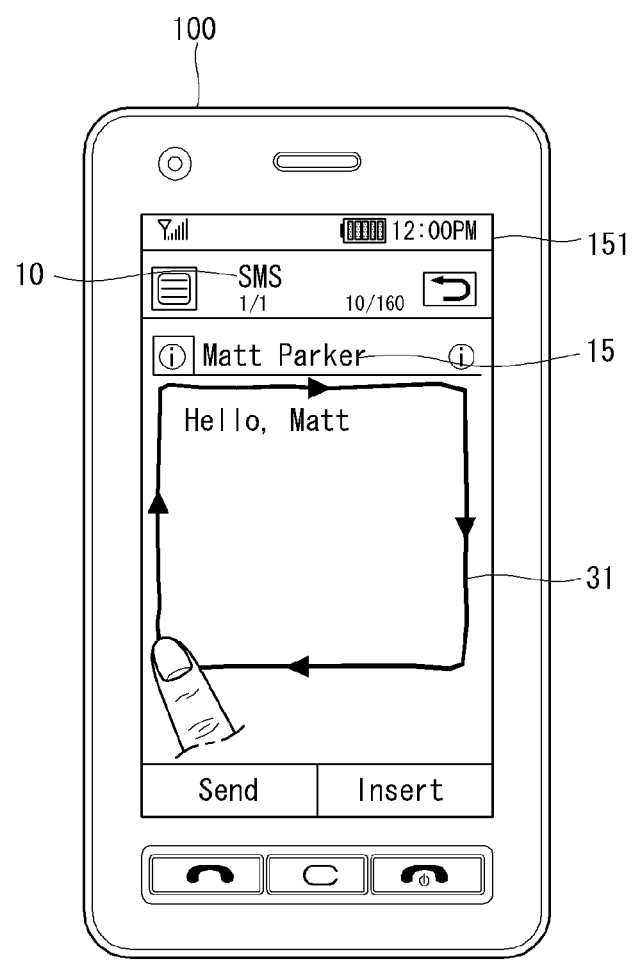

FIGS. 14A through 14H are exemplary screens illustrating the method of composing a message using the mobile terminal 100 according to the fifth embodiment of the present invention. As shown in FIG. 14A, the user can write a message using a text format in the SMS composition mode. As shown in FIG. 14B, the user can draw a track 31 completely surrounding the text using his or her finger or a track not completely surrounding the text.

Figure 14C:
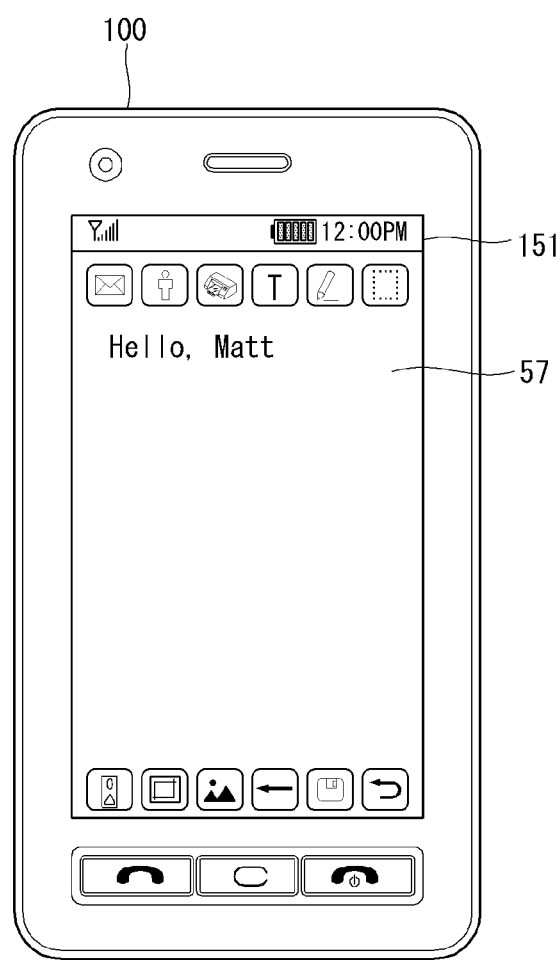

After the track 31 is completed, the controller 180 can switch the display unit 151 to a screen 57 corresponding to an image editing mode, as shown in FIG. 14C. For example, and as further shown in FIG. 14C, the image editing screen 57 can display text input or written in the SMS composition mode. In one embodiment, the text information shown in the image editing screen 57 can be a converted image.

Figure 14D:
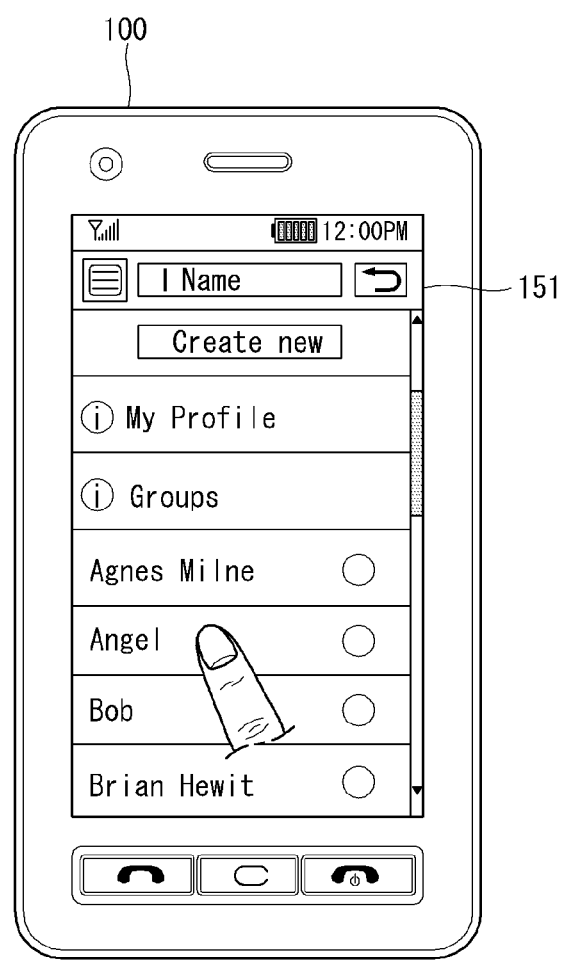
Figure 14E:
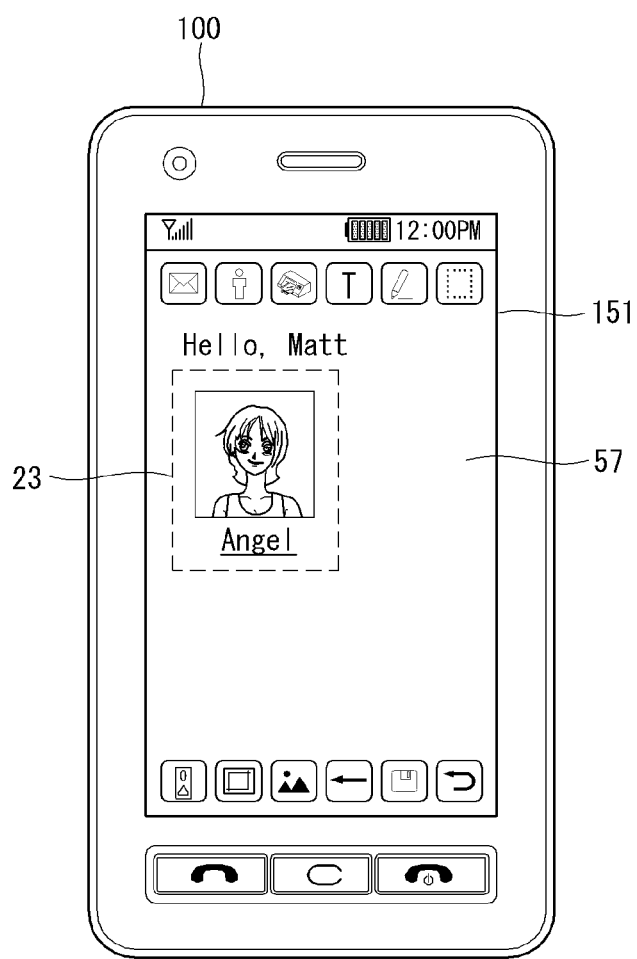

As shown in FIG. 14C, the controller 180 can change the message composition mode from the SMS composition mode to the MMS composition mode. As shown in FIG. 14D, the user can enter a phonebook list in response to an activation of a dedicated button provided in an image editing screen. The user can select a specific person or entity from the phonebook list and the controller 180 can insert an image corresponding to the selected person or entity into the image editing screen 57, as shown in FIG. 14E.

For example, when the user touches the image corresponding to the selected person or entity using his or her finger, phonebook information corresponding to the selected person or entity, such as a telephone number and e-mail, can be tagged together to the message being composed. It should be noted that the phonebook information can be linked to the message being composed without being displayed on the image editing screen 57.

Figure 14F:
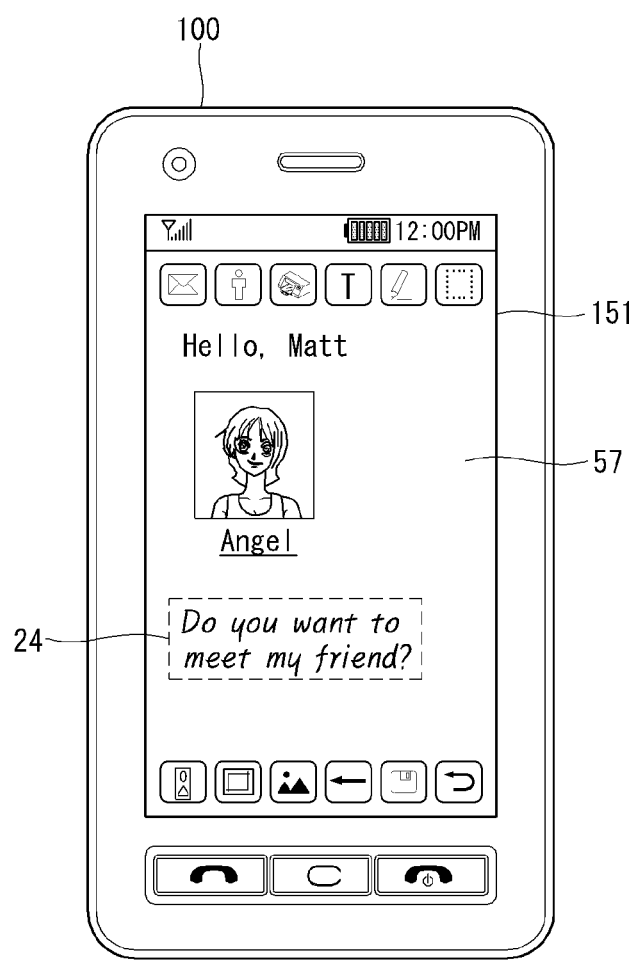
Figure 14G:
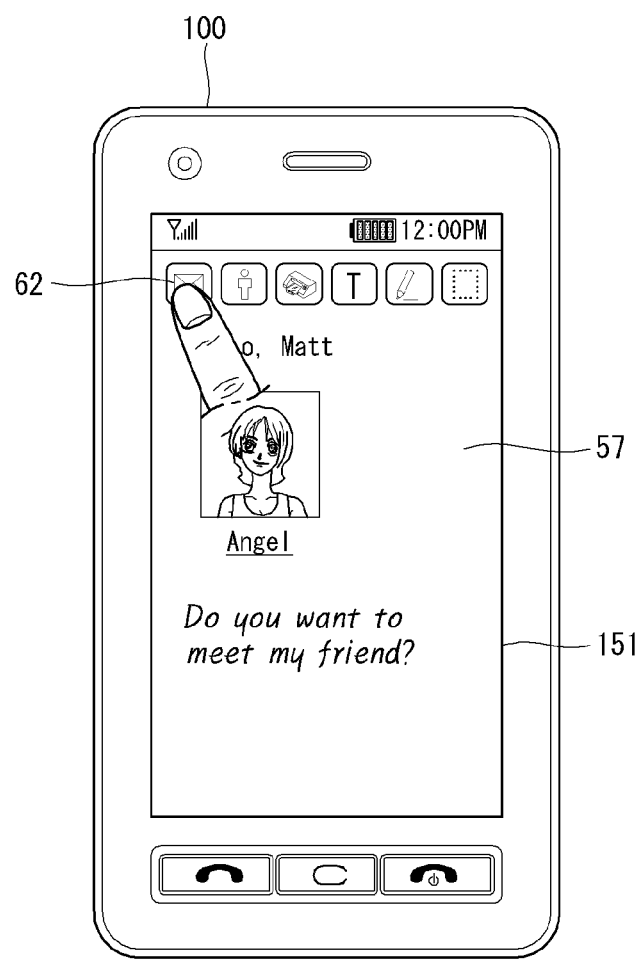
Figure 14H:
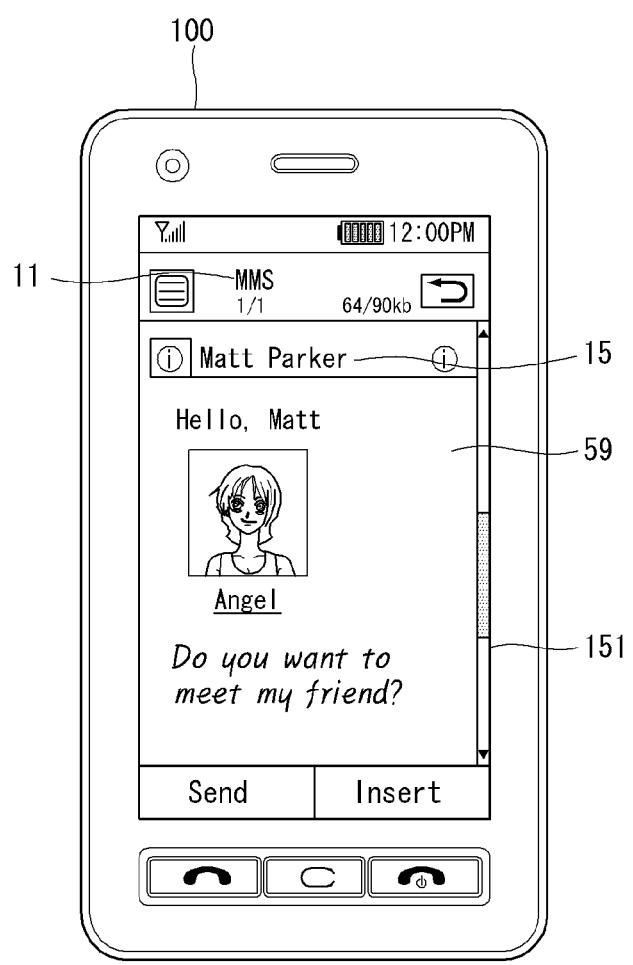

As shown in FIG. 14F, the controller 180 can receive a handwriting input from the user via the image editing screen 57 and provide a function of displaying the handwriting input on the image editing screen 57. For example, and as shown in FIG. 14F, the user can input handwriting content, such as handwriting content 24, directly on the image editing screen 57 via a touch input using his or her finger. As shown in FIG. 14G, when the user selects a specific button 62 provided in the image editing screen 57, the controller 180 can terminate the image editing screen 57 and switch to an MMS screen 59, as shown in FIG. 14H.

Figure 15:
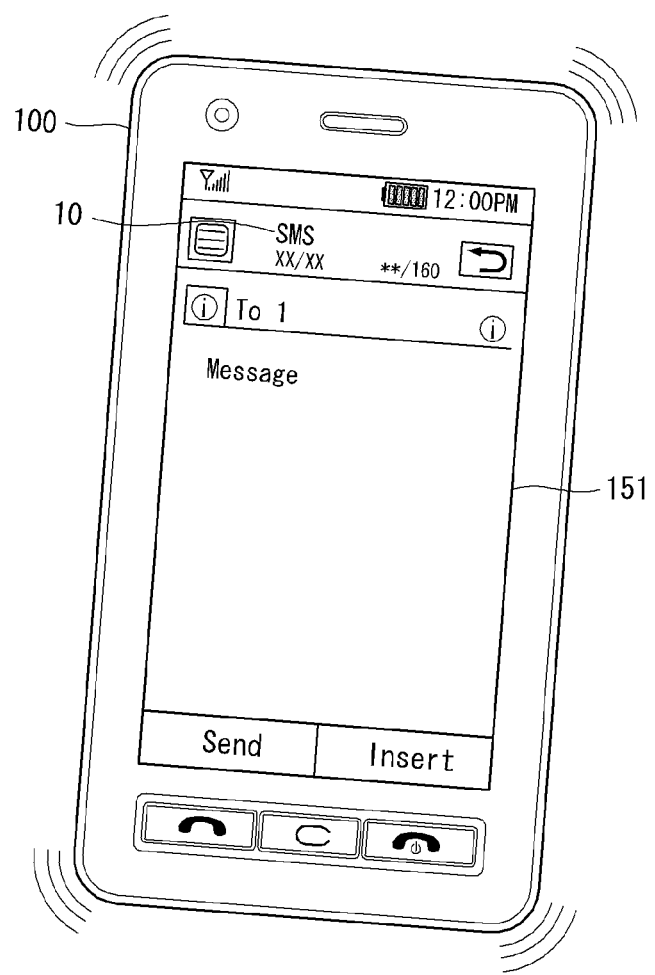
FIG. 15 is a diagram illustrating the change of a message composition mode according to one embodiment of the present invention.
Figure 16:
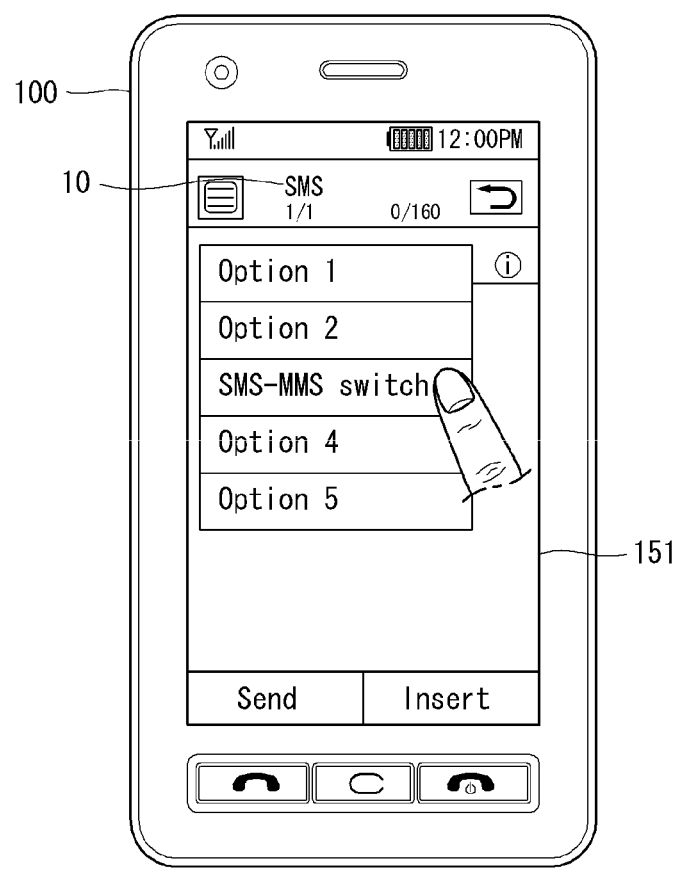
FIG. 16 is a diagram illustrating the change of a message composition mode according to one embodiment of the present invention.
Figure 17:
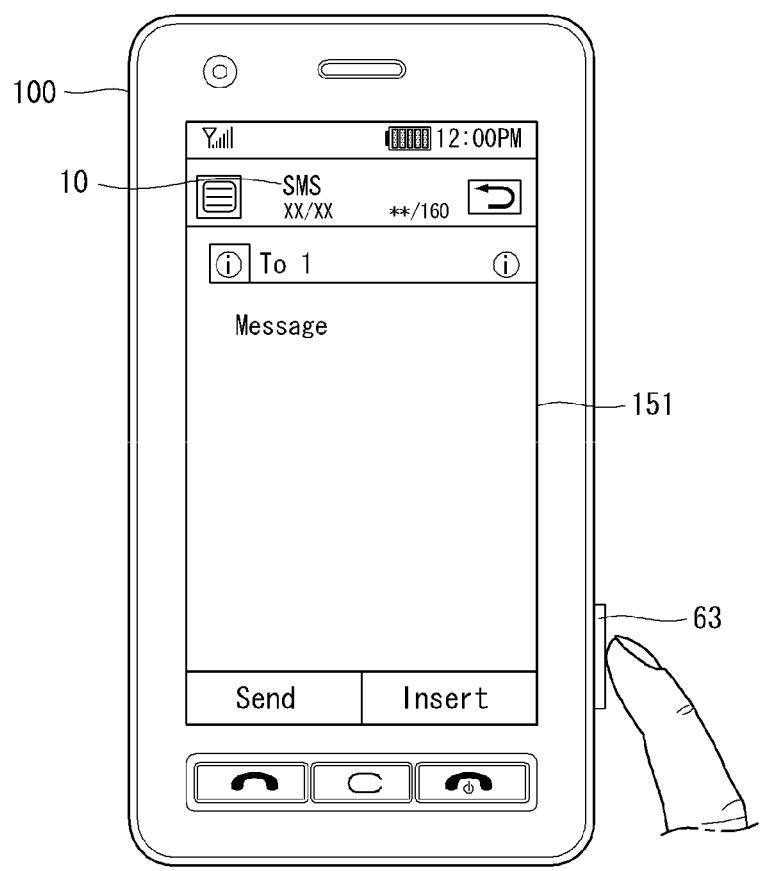
FIG. 17 is a diagram illustrating the change of a message composition mode according to one embodiment of the present invention.

FIGS. 15 through 17 are diagrams illustrating the change of a message composition mode according to other embodiments. For example, as shown in FIG. 15, when the user shakes the mobile terminal 100, the controller 180 can sense the shaking of the mobile terminal 100 via the sensing unit 140 and change the current message composition mode, such as the SMS composition mode, to another message composition mode, such as the MMS composition mode.

For example, as shown in FIG. 16, the user can change the current message composition mode, such as the SMS composition mode, to another message composition mode, such as the MMS composition mode, by searching a selectable menu of functions provided by the mobile terminal 100 and selecting a specific function, such as "SMS-MMS switch."

For example, as shown in FIG. 17, the mobile terminal 100 can be equipped with a specific key or button 63 for changing the message composition mode from a first message composition mode, such as the SMS message composition mode, to a second message composition mode, such as the MMS message composition mode. Therefore, when the user presses the specific key 63 in the first message composition mode, the controller 180 can change the first message composition mode to the second message composition mode.

Figure 18A:
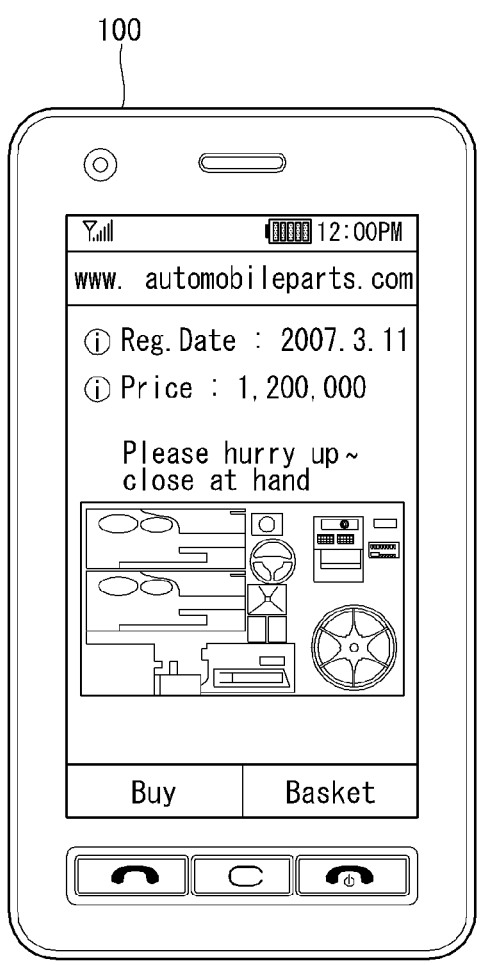
FIGS. 18A-18F are diagrams illustrating a method of composing a message using the mobile terminal according to one embodiment of the present invention and an operation of the mobile terminal implementing the method.

FIGS. 18A through 18F are diagrams illustrating a method of composing a message using the mobile terminal 100 according to a sixth embodiment of the present invention and an operation of the mobile terminal 100 implementing the method. As shown in FIG. 18A, for example, the mobile terminal 100 can access a specific Web site and display a Web page provided by the Web site on the display unit 151.

Figure 18B:
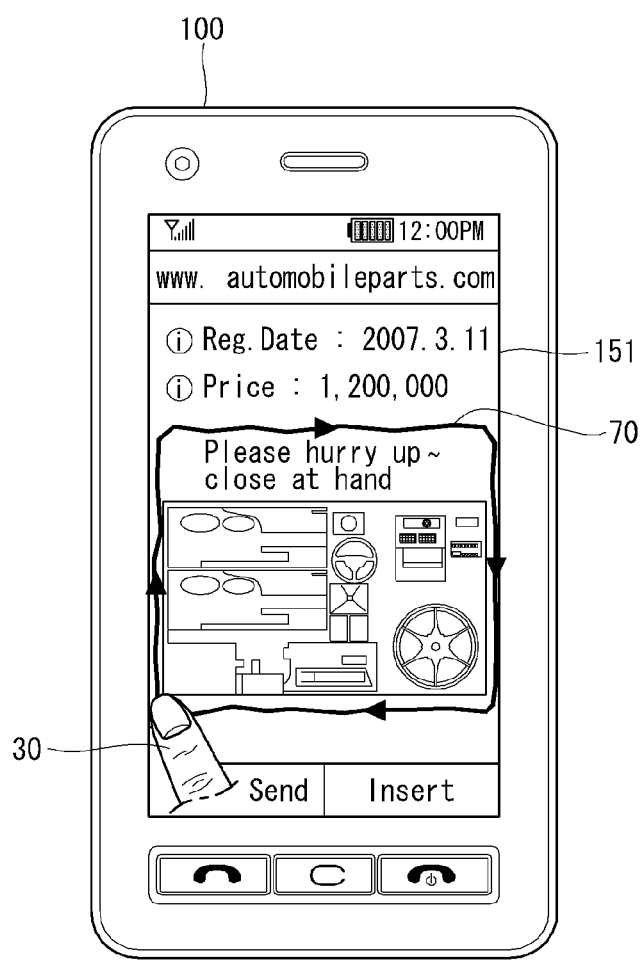
Figure 18C:
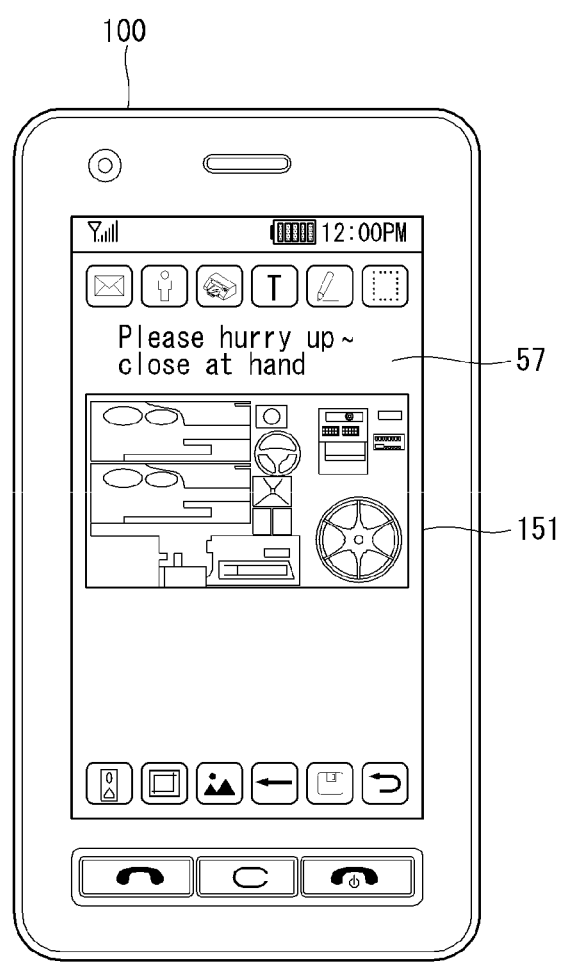

As shown in FIG. 18B, for example, the user can select a desired portion of the Web page by forming a specific track 70 enclosing the desired portion using his or her finger 30. The user can then drag the desired portion that is to be attached to a message using his or her finger, as shown in FIG. 18C. Upon determining that the specific track 70 has been completed, the controller 180 can capture the content enclosed within the specific track 70, enter the image editing mode, and display the captured content on the display 151 in the image editing mode.

Figure 18D:
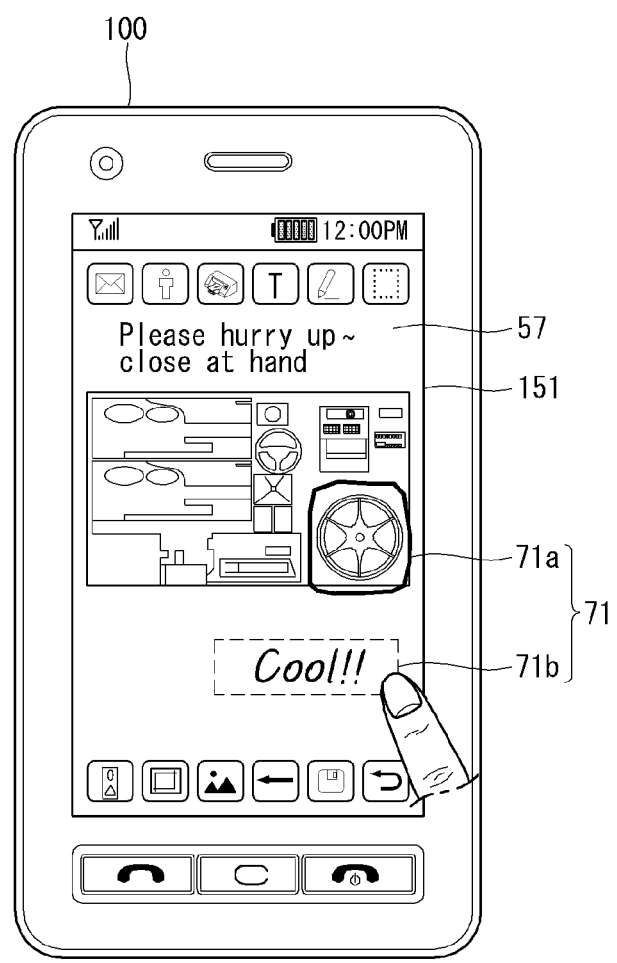

The controller 180 can receive handwriting input from the user in the image editing mode. As shown in FIG. 18D, for example, the user can draw a specific track 71*a* or input a specific image 71*b* via a touch input using his or her finger in the image editing mode.

Figure 18E:
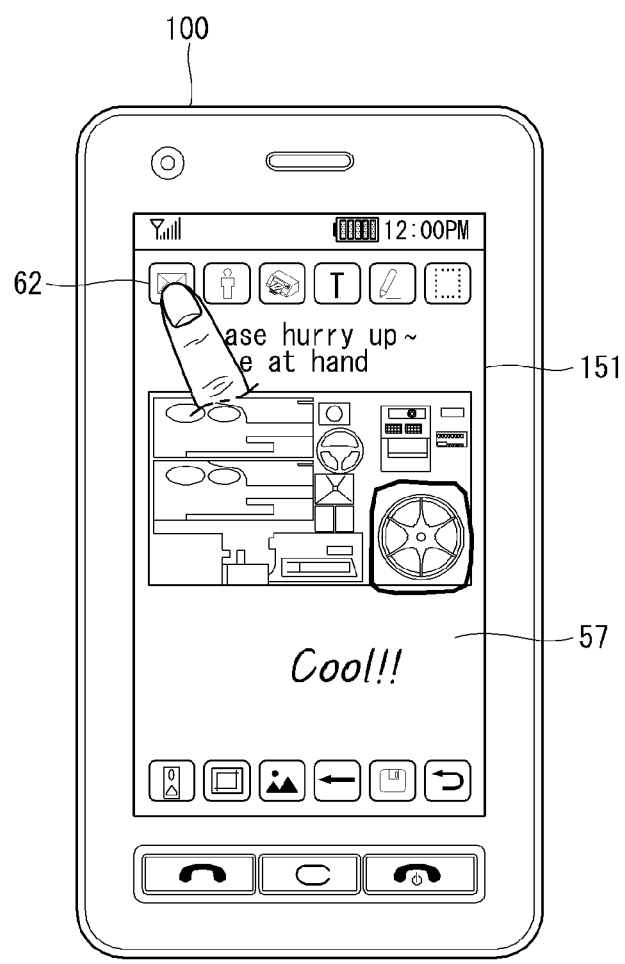
Figure 18F:
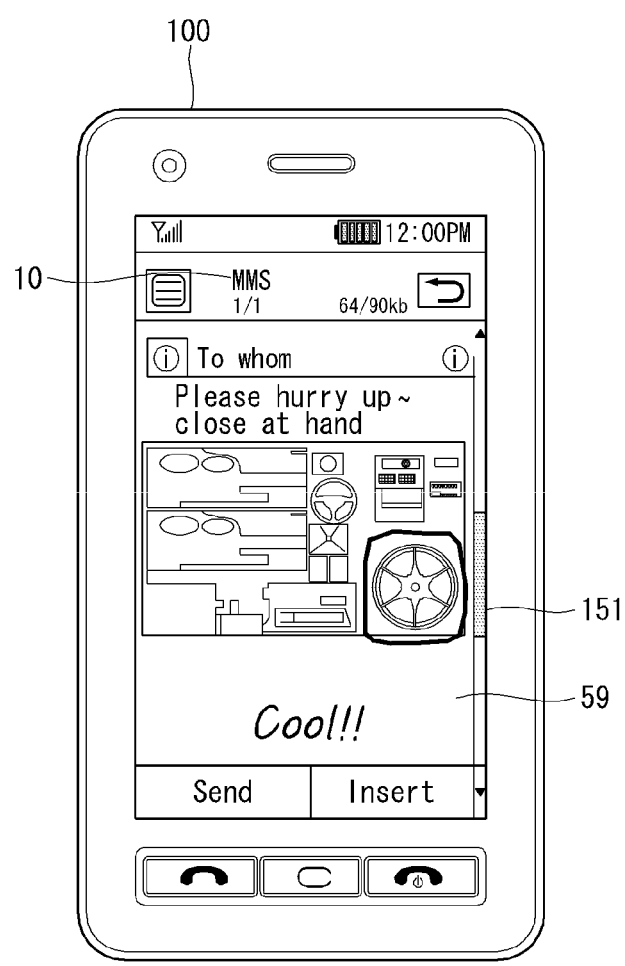

As shown in FIG. 18E, when the user selects a specific button 62 provided in the image editing screen 57, the controller 180 can terminate the image editing screen 57 and switch to an MMS screen 59, as shown in FIG. 18F.

The method of composing a message using the mobile terminal 100 according to the embodiments of the present invention can be written in a computer-readable recording medium in the form of a computer program and can then be provided. The method of composing a message using the mobile terminal according to the embodiments of the present invention can be executed through software.

When the method is executed using software, the components of the present invention are code segments that perform required tasks. The program or the code segments can be stored in a processor-readable medium or can be transmitted through a recording medium or in the form of computer data signals through a combination with carriers over a communication network.

The computer-readable recording medium includes all types of recording devices storing data which are readable by computer systems. The computer-readable recording medium can include, for example, ROM, RAM, CD-ROM, DVD±ROM, DVD-RAM, magnetic tapes, floppy disks, hard disks, and optical data storage devices. Further, the computer-readable recording medium can be distributed into network-coupled computer systems so that the computer-readable codes are stored and executed in a distributed fashion.

While the some embodiments of the present invention have been particularly shown and described, those of ordinary skill in the art can understand that various changes in form and details may be made therein without departing from the spirit and scope of the present invention as defined by the following claims.

What is claimed is:

1. A mobile terminal, comprising:
   a touch screen; and
   a controller configured to operate in a SMS (Short Message Service) composition mode for composing a message according to a SMS format and a MMS (Multimedia Messaging Service) composition mode for composing a message according to a MMS format,
   wherein the controller is further configured to:
   cause the touch screen to display a first message input screen for composing a SMS message;
   receive a track input at the first message input screen;
   capture content included within an area defined by the track input;
   switch the first message input screen to an image editing screen, such that the image editing screen is displayed on the touch screen;
   cause the touch screen to display the captured content on the image editing screen;
   receive a handwriting input at the image editing screen;
   cause the touch screen to display the received handwriting input on the image editing screen;
   switch the image editing screen to a second message input screen in response to an input, the second message input screen for composing a MMS message; and
   cause the touch screen to display the captured content and the handwriting input on the second message input screen.

2. The mobile terminal of claim 1, wherein text content of the SMS message is maintained for the MMS message.

3. The mobile terminal of claim 1,
   wherein content of the SMS message having a format not supported in the MMS composition mode is not displayed on the second message input screen.

4. The mobile terminal of claim 3, wherein the content of the SMS message having a format not supported in the MMS composition mode is stored in memory.

5. The mobile terminal of claim 1,
   wherein content of the SMS message having a format not supported in the MMS composition mode is converted to a format supported in the MMS composition mode.

6. The mobile terminal of claim 5, wherein the format supported in the MMS composition mode is a text format.

7. The mobile terminal of claim 1,
   wherein the controller further configured to;
   cause the touch screen to display a screen for selecting a displayed item; and
   insert the selected item into the image editing screen.

8. The mobile terminal of claim 7,
   wherein the screen for selecting at least one image comprises a phonebook.

9. The mobile terminal of claim 1,
   wherein the message input screen comprises at least one of a region for displaying messages, a region for displaying a keypad, a region for displaying message recipient information, or a region for displaying a message format indicator.

10. The mobile terminal of claim 1,
    wherein the controller is further configured to convert the captured content into an image format, wherein the captured content comprises text information.

11. The mobile terminal of claim 1,
    wherein the track input comprises a touch input enclosing any portion of the message input screen.

12. The mobile terminal of claim 1,
    wherein the controller is configured to switch the first message input screen to the image editing screen when a ending point of the track input meets a starting point of the track input.

13. The mobile terminal of claim 1, further comprising a memory,
    wherein the controller is further configured to store the captured content in the memory.

14. The mobile terminal of claim 1, wherein the controller is further configured to store the image editing screen comprising the captured content and the handwriting input in the memory.

15. The mobile terminal of claim 1, further comprising
    a sensing unit,
    wherein the controller is further configured to switch the image editing screen to the second message input screen in response to a shaking of the mobile terminal sensed via the sensing unit.

16. The mobile terminal of claim 1,
    wherein the track input comprises at least one of a character, a numeral, a symbol, or a closed shape.

17. The mobile terminal of claim 1, wherein the controller is further configured to:
    cause the touch screen to display a key simultaneously with the displaying of the image editing screen, wherein the input that causes the switching of the image editing screen to the second message input screen is an input received at the displayed key.

18. A mobile terminal, comprising:
    a touch screen; and
    a controller configured to;
    cause the touch screen to display a web page comprising content;
    receive a track input at the web page;
    capture content included within an area defined by the track input;
    enter an image editing mode for editing the captured content;
    cause the touch screen to display the captured content on an image editing screen;
    receive a handwriting input at the image editing screen;
    cause the touch screen to display the received handwriting input on the image editing screen;
    switch the image editing screen to a message input screen in response to a received input, the message input screen for composing a MMS (Multimedia Messaging Service) message in response to a received input; and
    cause the touch screen to display the captured content and the handwriting input on the message input screen.

19. The mobile terminal of claim 18,
    wherein the track input comprises a touch input enclosing any portion of the web page.

20. The mobile terminal of claim 18,
wherein the image editing screen comprises at least one icon associated with image editing.

21. The mobile terminal of claim 18,
wherein the controller is further configured to receive an image at the image editing screen.

22. The mobile terminal of claim 18,
wherein the controller is configured to receive the handwriting input by a stylus pen.

23. The mobile terminal of claim 18, further comprising a memory,
wherein the controller is further configured to store the captured content and the handwriting input in the memory.

* * * * *